US012604807B2

(12) United States Patent (10) Patent No.: US 12,604,807 B2

Digman (45) Date of Patent: Apr. 21, 2026

(54) AGRICULTURAL SYSTEM FOR CONTROLLABLY OPTIMIZING HARVESTING OF FORAGE

(71) Applicant: CNH Industrial America LLC, New Holland, PA (US)

(72) Inventor: Michael Jacob Digman, Denver, PA (US)

(73) Assignee: CNH Industrial America PLLC, New Holland, PA (US)

( * ) Notice: Subject to any disclaimer, the term of this patent is extended or adjusted under 35 U.S.C. 154(b) by 955 days.

(21) Appl. No.: 17/488,772

(22) Filed: Sep. 29, 2021

(65) Prior Publication Data

US 2022/0210975 A1 Jul. 7, 2022

Related U.S. Application Data

(63) Continuation-in-part of application No. 17/141,651, filed on Jan. 5, 2021, now Pat. No. 12,029,154.

(51) Int. Cl.
| | |
|---|---|
| *A01D 43/08* | (2006.01) |
| *A01F 15/00* | (2006.01) |
| *A01F 29/09* | (2010.01) |

(52) U.S. Cl.
CPC ............ *A01D 43/085* (2013.01); *A01F 15/00* (2013.01); *A01F 29/09* (2013.01)

(58) Field of Classification Search
CPC .. A01D 43/085; A01D 34/006; A01D 43/102; A01F 15/00; A01F 29/09
See application file for complete search history.

(56) References Cited

U.S. PATENT DOCUMENTS

| | | |
|---|---|---|
| 6,185,990 B1 | 2/2001 | Missotten et al. |
| 6,584,390 B2 | 6/2003 | Beck |
| | (Continued) | |

FOREIGN PATENT DOCUMENTS

| | | |
|---|---|---|
| EP | 1 446 997 B2 | 10/2014 |
| EP | 3162189 A2 | 5/2017 |
| | (Continued) | |

OTHER PUBLICATIONS

Extended European Search Report for EP Application No. 22198261.4 dated Feb. 24, 2023 (eight pages).

*Primary Examiner* — Dylan M Katz

(74) *Attorney, Agent, or Firm* — CM Law PLLC; Stephen J. Weed

(57) ABSTRACT

An agricultural system for harvesting a forage crop material, includes: a first agricultural work equipment for controllably harvesting the forage crop material, the first agricultural work equipment including: a first forage processing assembly; a first control system including: a first forage processing assembly condition sensor configured for sensing a first actual condition of the first forage processing assembly and thereby for outputting a first actual condition signal associated with the first actual condition of the first forage processing assembly; a first controller operatively coupled with the first forage processing assembly condition sensor and the first forage processing assembly and configured for: receiving the first actual condition signal; determining a first adjustment signal based at least in part on the first actual condition signal and at least one first predicted forage crop material condition associated with a first forage processing operation; outputting the first adjustment signal and thereby for initially adjusting, prior to beginning the first forage processing operation, a first device of the first forage processing assembly.

10 Claims, 12 Drawing Sheets

(56) References Cited

U.S. PATENT DOCUMENTS

| | | | |
|---|---|---|---|
| 6,686,749 B2 | 2/2004 | Rains et al. | |
| 10,188,025 B2 | 1/2019 | Kirk et al. | |
| 2004/0002368 A1 | 1/2004 | Shinners et al. | |
| 2016/0078570 A1 | 3/2016 | Ethington et al. | |
| 2018/0116121 A1* | 5/2018 | Murray | A01D 78/00 |
| 2018/0303031 A1* | 10/2018 | Araki | A01D 43/085 |
| 2019/0057461 A1 | 2/2019 | Ruff et al. | |
| 2021/0031624 A1* | 2/2021 | Ishikawa | A01F 15/08 |
| 2021/0360857 A1 | 11/2021 | Steidinger et al. | |
| 2022/0071091 A1* | 3/2022 | Heitmann | A01D 43/085 |
| 2022/0113161 A1* | 4/2022 | Vandike | B60K 35/10 |

FOREIGN PATENT DOCUMENTS

| | | | |
|---|---|---|---|
| EP | 3400782 A1 | 11/2018 | |
| KR | 10-0552630 B1 | 2/2006 | |
| WO | 2016/118686 A1 | 7/2016 | |

* cited by examiner

234B

968

227

AGRICULTURAL SYSTEM FOR CONTROLLABLY OPTIMIZING HARVESTING OF FORAGE

CROSS REFERENCE TO RELATED APPLICATION

This is a continuation-in-part of U.S. patent application Ser. No. 17/141,651, entitled "MOWER-CONDITIONER MACHINE FOR SENSING MOISTURE CONTENT OF CROP MATERIAL", filed Jan. 5, 2021, which is incorporated herein by reference.

FIELD OF THE INVENTION

The present invention pertains to an agricultural system, and, more specifically, to an agricultural system and method for optimizing the harvesting of forage crop material as hay or silage.

BACKGROUND OF THE INVENTION

Generally speaking, forage (which can also be referred to herein as crop, crop material, forage crop, forage material, or forage crop material) is plant matter that can be harvested and provided to livestock or other animals as fodder, including but not limited to cattle, sheep, goats, and horses, during, for example, the winter or at other times when pasture land has inadequate amounts of vegetation for livestock of other animals. Depending upon the processing of the forage, forage can be formed into hay or silage. Both hay and silage can be made from grass and legumes (or mixtures thereof), and silage can also be made from, for example, corn or wheat. One difference between hay and silage is that hay has a much lower moisture content than silage; for example, hay can have a moisture content of 12%, whereas silage can be chopped or baled at a moisture content of 40-60%, hay thus being much drier. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

The harvesting of forage seeks to maximize both the quantity (that is, the yield) and the quality of the hay or silage, the quantity also be referred to as the yield, the quality being the feed value of the hay or silage, such as the level of dry matter, the level of crude protein, and/or the energy provided, for example, in terms of total digestible nutrients (TDN) or the net energy of maintenance (NEM). These factors require balancing relative to one another. For example, maximizing quantity requires maximizing growth, which requires continued growing through various growth stages of the plant. But, such continued growth, if allowed for too long, can diminish the nutritional value of the plant. Thus, the timing of the cutting of the crop material can be critical to making high yield hay or silage with high nutritional value and depends upon various factors including not only the type and variety of grass or legume (for example) but also the location of the field to be harvested as well as the weather (dry, sunny weather can be optimal). For example, with respect to orchard grass when making hay, a first cutting of the season can occur from boot to early head stage, and for alfalfa a first cutting of the season can occur during the bud stage. Further, haymaking operations include not only cutting but also can include tedding, raking, merging, chopping, baling, bale retrieval, covering, transport, and/or storage, whereas silage-making operations can include not only cutting but also chopping, baling, and/or ensiling (or at least some sort of covering). Depending upon location, when making hay or silage, the crop can be harvested two, three, four, five, six, or possibly seven times during a single season, each cycle of harvesting during a single season being time dependent, as well as various haymaking or silage-making operations of each cycle, such as cutting, tedding, raking, merging, chopping, baling, covering, and/or ensiling, as is known. Timing the operations properly often endeavors to obtain an optimal dry matter of the crop material—stated conversely, a certain moisture content—in its final condition to be stored and served to livestock, which can entail monitoring the moisture content of the crop material at various stages of the process so as to dry down the crop material to a desired level (such dried down hay, for example, can be beneficial so as to concentrate the nutritional value in the final hay product and to reduce its combustibility during storage, the likelihood of it becoming moldy, and its weight for transport). Not only is timing critical for making high value hay or silage, but so is the processing of the crop material during haymaking or silage-making operations. For instance, the leafy material of alfalfa is quite nutritious and farmers often seek to preserve this leafy material for the livestock during haymaking operations. Accordingly, a mower-conditioner assembly can be used to cut the standing crop material, for example, and to immediately thereafter condition, for example, a legume plant such as alfalfa by breaking, splitting, or crimping a stem of the alfalfa plant so as to facilitate the dry down process while preserving the leaves of the alfalfa plant through the conditioner. Not only is the precise timing of the various haymaking and silage-making operations difficult for a producer to determine but so is the precise processing of the hay or silage crop material so as to produce a large quantity with high feed value.

What is needed in the art is a way to produce hay or silage with high feed value that is efficient and precise.

SUMMARY OF THE INVENTION

The present invention provides an agricultural system and method for controllably and precisely harvesting forage crop material.

The invention in one form is directed to an agricultural system for harvesting a forage crop material, the agricultural system including: a first agricultural work equipment for controllably harvesting the forage crop material, the first agricultural work equipment including: a first forage processing assembly; a first control system including: a first forage processing assembly condition sensor configured for sensing a first actual condition of the first forage processing assembly and thereby for outputting a first actual condition signal associated with the first actual condition of the first forage processing assembly; a first controller operatively coupled with the first forage processing assembly condition sensor and the first forage processing assembly and configured for: receiving the first actual condition signal; determining a first adjustment signal based at least in part on the first actual condition signal and at least one first predicted forage crop material condition associated with a first forage processing operation; outputting the first adjustment signal and thereby for initially adjusting, prior to beginning the first forage processing operation, a first device of the first forage processing assembly.

The invention in another form is directed to an agricultural work equipment for controllably harvesting a forage crop material and being of an agricultural system for harvesting the forage crop material, the agricultural work equipment including: a forage processing assembly; a control system including: a forage processing assembly condition sensor configured for sensing an actual condition of the forage processing assembly and thereby for outputting an actual condition signal associated with the actual condition of the forage processing assembly; a controller operatively coupled with the forage processing assembly condition sensor and the forage processing assembly and configured for: receiving the actual condition signal; determining a first adjustment signal based at least in part on the actual condition signal and at least one predicted forage crop material condition associated with a forage processing operation; outputting the first adjustment signal and thereby for initially adjusting, prior to beginning the forage processing operation, a device of the forage processing assembly.

The invention in yet another form is directed to a method for controllably harvesting a forage crop material by an agricultural system, the method including the steps of: providing the agricultural system which includes a first agricultural work equipment for controllably harvesting the forage crop material, the first agricultural work equipment including a first forage processing assembly and a first control system including a first forage processing assembly condition sensor and a first controller operatively coupled with the first forage processing assembly condition sensor and the first forage processing assembly; sensing, by the first forage processing assembly condition sensor, a first actual condition of the first forage processing assembly and thereby outputting a first actual condition signal associated with the first actual condition of the first forage processing assembly; receiving, by the first controller, the first actual condition signal; determining, by the first controller, a first adjustment signal based at least in part on the first actual condition signal and at least one first predicted forage crop material condition associated with a first forage processing operation; and outputting, by the first controller, the first adjustment signal and thereby for initially adjusting, prior to beginning the first forage processing operation, a first device of the first forage processing assembly.

An advantage of the present invention is that it provides a way to controllably and precisely harvest forage crop material using a mower-conditioner and/or a self-propelled hay cutting machine.

Another advantage is that it provides a way to time subsequent forage processing operations using measured inputs from a prior forage processing operation.

Yet another advantage of the present invention is that it provides a way to controllably and precisely perform a forage processing operation using measured inputs from a prior forage processing operation.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used herein in connection with an agricultural work equipment and/or components thereof are usually determined with reference to the direction of forward operative travel of the work equipment, but they should not be construed as limiting. The terms "longitudinal" and "transverse" are determined with reference to the fore-and-aft direction of the work equipment and are equally not to be construed as limiting. The terms "downstream" and "upstream" are determined with reference to the intended direction of crop material flow during operation, with "downstream" being analogous to "rearward" and "upstream" being analogous to "forward." Further, as indicated above, forage includes hay and silage, and forage processing operations include haymaking operations and silage-making operations, and forage processing assemblies include haymaking assemblies and silage-making assemblies; much overlap exists between the operations and the assemblies, and one skilled in the art will be able to readily make the distinctions whenever necessary.

Figure 1:
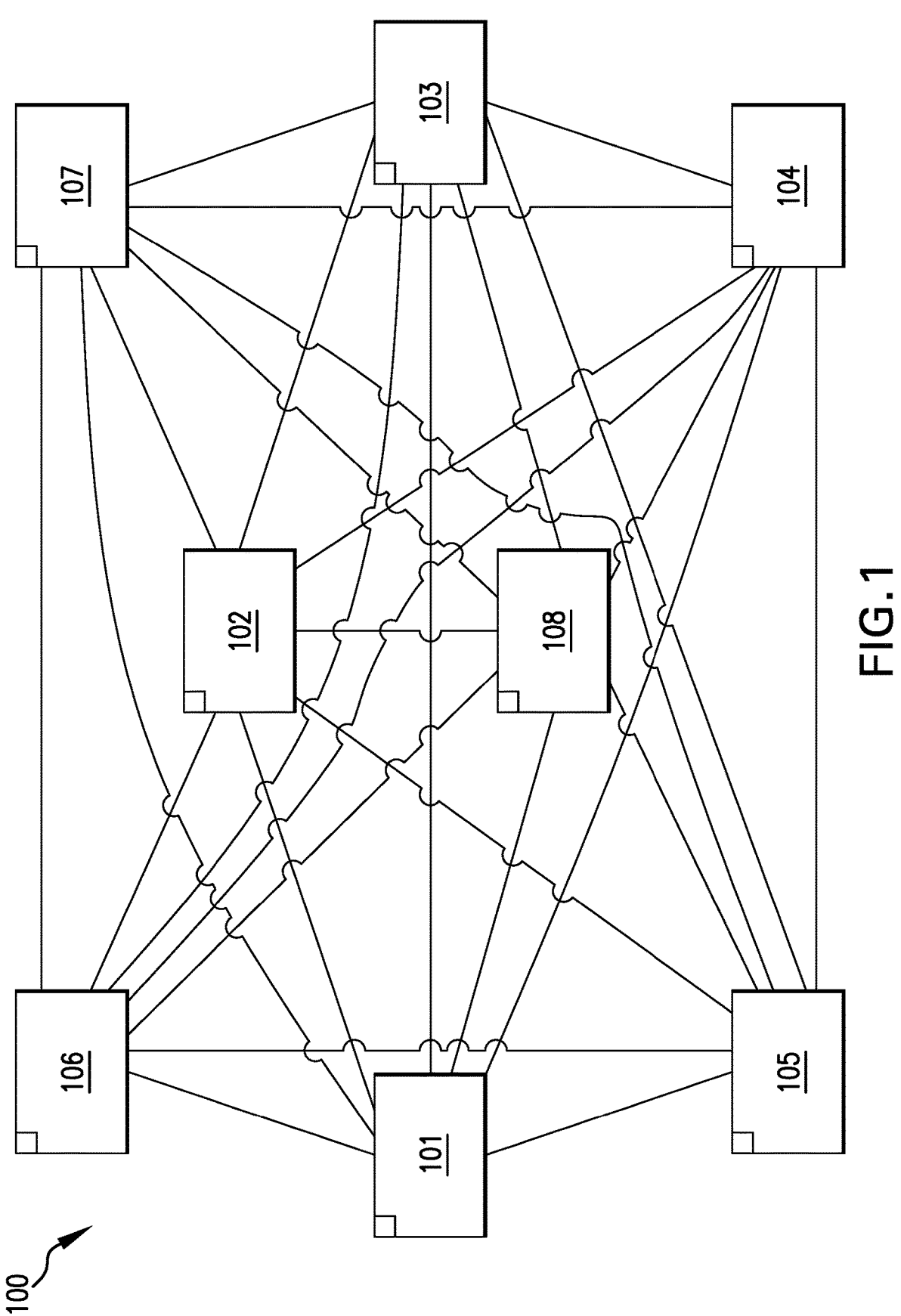
FIG. 1 illustrates a schematic view of an exemplary embodiment of an agricultural system, in accordance with an exemplary embodiment of the present invention.

Referring now to the drawings, and more particularly to FIG. 1, there is shown an embodiment according to the present invention of an agricultural system 100 for harvesting forage crop material. Such an agricultural system 100 can include any suitable sort of agricultural work equipment for controllably harvesting the forage crop material, a plurality of such agricultural work equipment, and/or at least one computing machine (which can also be referred to herein as a computer), each agricultural work equipment and computing machine being operatively coupled with each other. For example, FIG. 1 shows that agricultural system 100 can includes seven such agricultural work equipment 101, 102, 103, 104, 105, 106, 107 and such a computing machine 108. Each agricultural work equipment 101-107 and computing machine 108 includes its own control system including a controller and any applicable sensors and adjusters, as represented by the interior box within the box of each of 101-108 in FIG. 1. It can be appreciated that agricultural system 100 can include any suitable number of the agricultural equipment and any suitable number of computing machines. Each of agricultural equipment 101-107 and computing machine 108 are operatively coupled with one another in any suitable way. Addressing computing machine 108 first, such a computing machine 108 can include (by way of example and not limitation) a desktop computer, a laptop computer, a smartphone, a smart watch, a tablet computer, or a phablet. Further, the computing machine 108 can communicate (i.e., inputting and outputting) in any suitable manner with any agricultural work equipment or any other computing machine (including what is referenced herein, including the controller of any agricultural equipment 101-107, or any other computing devices, including servers, cloud servers, or the like), such as by hardwire, wirelessly, WiFi, ethernet, Bluetooth, cellular, satellite, Internet, or on a local area network, a metropolitan area network, or a wide area network.

Regarding the agricultural work equipment 101, 102, 103, 104, 105, 106, 107 each can be the same as the other, different from each other, or similar in part and different in part. The agricultural work equipment for performing any forage processing operation can include agricultural work equipment that is self-propelled or not self-propelled. By way of example and not limitation, such agricultural equipment can include a self-propelled agricultural vehicle that includes portions permanently affixed thereto that can perform any forage processing function. Alternatively, such agricultural equipment can include a self-propelled agricultural vehicle (which can be referred to simply as an agricultural vehicle) and any attachment or implement (attachments and implements are used interchangeably herein) attached to any portion of the agricultural vehicle (such attachments can be referred to herein as forage processing assemblies). Such attachments can be a header (which can also be referred to as a head) generally attached to a front portion of the agricultural vehicle or any attachment attached to a side or rear of the agricultural vehicle. Such an agricultural vehicle can be, for example, a windrower, a forage cruiser (which can also be referred to as a forage harvester), or a tractor. Windrowers can include different types of headers attached thereto. For instance, the header can perform both mowing (cutting the forage crop material so as to separate it from the ground) and conditioning (i.e., splitting, breaking, bending, crushing, cracking, and/or crimping stems (for example, of grass or legumes) every three to four inches, or removing the wax of grass in whole or in part) and also lay the cut and conditioned forage crop material back onto the ground in a swath or windrow behind the windrower; such headers can include sicklebar headers and rotary disc headers. Windrowers can also include an attachment(s) that not only cuts and conditions the forage crop material but also lays the forage crop material in a windrow not directly behind the windrower but to the side of the windrower, thereby enabling the operator to combine swaths or windrows, so as to eliminate subsequent raking and/or merging operations. The forage cruiser can include, for example, a header that picks up and/or conditions a swath or windrow of forage crop material, the forage cruiser also chopping the picked-up forage crop material and blowing it out through a spout into an adjacent trailer or the like for carrying chopped forage crop material off of the field. Regarding tractors, for forage processing operations tractors typically include attachments attached to the rear or side of the tractor. Such attachments include a mower, a mower-conditioner, a pull-type forage harvester, a tedder, a rake, a merger, a baler, and a bale retriever. A mower cuts the standing forage crop material and can be, for instance, a sicklebar mower, or a disc mower (which can also be referred to as a rotary disc mower). Further, the mower can be positioned relatively near the tractor or positioned so as to extend away from the tractor by an elongate arm (which can be rigid or articulated), such as a pull-type disc power. The mower-conditioner can include a cutting device (which can be rotating discs, or a sicklebar, for example) and a conditioning device, which facilitates dry-down of the forage crop material. The conditioning device can include, in the alternative, a rubber-on-rubber design (for example, two chevron rubber rolls positioned vertically relative to one another, between which cut forage crop material passes), a steel-on-steel design (for example, two steel rolls positioned vertically relative to one another, between which cut forage crop material passes), or a flail conditioning design (which provides a scuffing action on the forage crop material, so as to remove a waxy outer layer for faster dry-down of, for example, grass). The pull-type forage harvester can include a swath or windrow pick-up, a chopper, a blower, and a spout for directing the chopped forage crop material to a trailer or the like for holding the chopped forage crop material. The tedder can include tines or forks for fluffing and/or aerating the forage crop material that has already been cut and is lying on the ground, so as to facilitate dry-down (curing) of the forage crop material. The rake, such as a wheel rake, can include wheels for raking forage crop material that is spread out on the ground and/or in a plurality of windrows or swaths into a single windrow. The merger can pick up a swath or windrow lying on the ground and move it to the side so as to merge a plurality of swaths or windrows together. The baler bales forage crop material lying on the ground in swaths or windrows and includes round balers, large square balers, and small square balers. The bale retriever can pick up bales of forage previously left in the field.

Thus, agricultural system 100 can include a variety of work equipment to perform different forage processing operations, suitable to the particular forage grower/harvester (which can be referred to herein as the operator, user, or end user). As indicated, agricultural system 100 can include, according to an exemplary embodiment of the present invention, agricultural equipment 101-107 and computing system 108, wherein agricultural work equipment 101 performs the forage processing operation of mowing-conditioning, agricultural work equipment 102 performs the forage processing operation of tedding, agricultural work equipment 103 performs the forage processing operation of raking, agricultural work equipment 104 performs the forage processing operation of baling, agricultural work equipment 105 performs the forage processing operation of bale retrieving, agricultural work equipment 106 performs the forage processing operation of chopping, and agricultural work equipment 107 performs the forage processing operation of merging. Agricultural system 100 can be suitable for any overall forage processing operation, such as, but not limited to, making hay, making baleage, or chopping forage material for silage, as are known in the art. To make hay, for example, the haymaking operations can include mowing-conditioning the hay crop material, tedding the hay crop material, merging or raking the hay crop material, baling the hay crop material, and retrieving the bales of hay. Thus, an exemplary embodiment of agricultural system 100 can include, for example, an agricultural work equipment 101 formed as a tractor plus a mower-conditioner attached thereto to perform the initial forage processing operation of mowing/conditioning, an agricultural work equipment 102 formed as a tractor plus a tedder attached thereto to perform the forage processing operation of tedding, an agricultural work equipment 103 formed as a tractor plus a wheel rake attached thereto to perform the forage processing operation of raking, an agricultural work equipment 104 formed as a tractor plus a baler attached thereto to perform the forage processing operation of baling, an agricultural work equipment 105 formed as a bale retriever formed as a tractor plus a bale retrieving device to perform the forage processing operation of bale retrieving, and a computing machine 107 (each forage processing operation includes a tractor, only by way of example and not limitation). Further, for chopping forage material for silage, the forage processing operations can include mowing-conditioning (that is, cutting and conditioning the crop material using the same attachment) and chopping the crop material. Thus, another exemplary embodiment of the agricultural system 100 can include, for example, an agricultural work equipment 101 (as described) and work equipment 106, which can include a chopper. Work equipment 106 can be formed as a self-propelled device including a chopper, or can be formed as a tractor plus a chopper attached thereto to perform the forage processing operation of chopping. Each of work equipment 101, 102, 103, 104, 105, 106, 107 and computing device 108 can be operatively coupled with another, according to the needs of grower/harvester. For example, each of equipment 101, 102, 103, 104, 105, 106, 107 can be operatively coupled with one another and with computing machine 108 in any suitable manner, so as to be able to share information amongst one another, and each can include a controller that includes the same or substantially similar software (which can be referred to herein as software application, software code, or code, all having the same referent) with respect to forage processing operations. According to an embodiment of system 100, each of 101-108 can be separate from one another, but for the operative coupling of their respective control systems with one another. On the other hand, according to another embodiment of the system 100, system 100 can include a single tractor used with each of the different attachments used to perform the different forage processing operations associated with equipment 101-107. By using the same tractor (though with different attachments), the tractor can include a same computing device, such as the same controller, from forage processing operation to forage processing operation, which can store data associated with each forage processing operation (even so, 101-107 are still distinct agricultural equipment because of the different attachments, even though the same tractor is used), data which can be readily used to perform each subsequent forage processing operation. Even so, it can be that the respective attachment of equipment 101-107 can also include a respective controller which can be different from the controller of the other attachments. But it can be appreciated that the same controller of the tractor can be operatively coupled with, and thus readily communicate with and prioritize tasks relative to, the attachment's controller for any current and subsequent forage processing operation in which the tractor and its controller is used (thus, herein, a controller of a respective work equipment, for simplicity of discussion, includes not only the controller for the tractor but also any controller of any attachment, but the controller of the respective work equipment is referenced and shown herein as that of the tractor). Though the controller of the tractor is the same for each forage processing operation when the same tractor is used, for purposes of this disclosure these same controllers of the tractor are deemed to be operatively coupled with one another. Further, according to another embodiment of system 100, the controller of the tractor (which is used for each forage processing operation) can be the same as the computing machine 106, and as such can still be considered to be operatively coupled with one another (though not separate devices). According to another embodiment of system 100, any combination of what has been described can be used; for instance, the tractor can be the same for the first two forage processing operations, but a different tractor can be used for the third forage processing operation, and so on; each work equipment, however, can still be operatively coupled with one another, so as to be able to exchange information. Further, each controller and computing machine within network 100 can include a substantially similar software application that can be specifically designed to address various forage processing operations.

Figure 2:
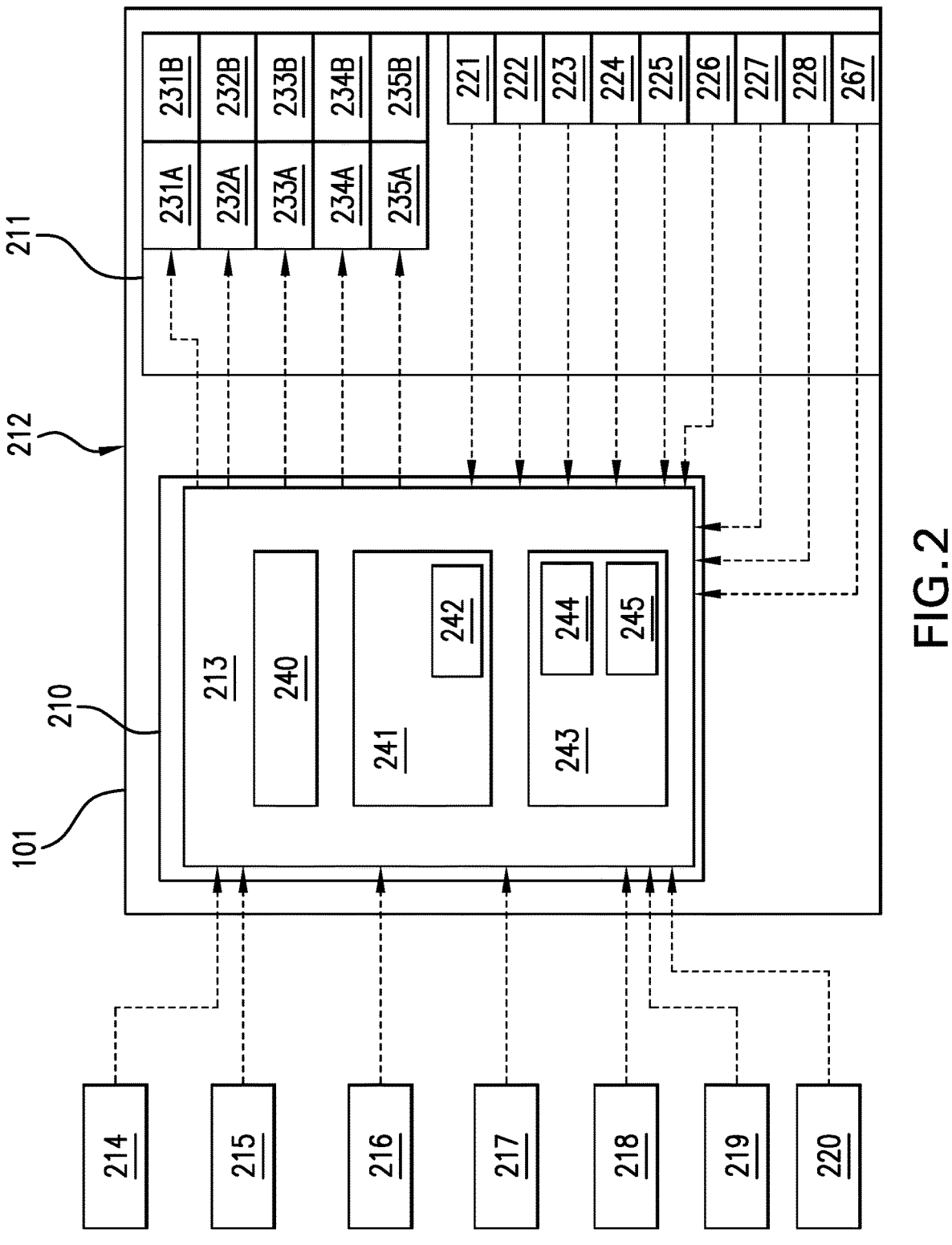
FIG. 2 illustrates a schematic view of an agricultural work equipment of the agricultural system of FIG. 1, in accordance with an exemplary embodiment of the present invention.

Referring now to FIG. 2, there is shown a schematic diagram of agricultural work equipment 101. Work equipment 101 includes a tractor 210, a mower-conditioner 211 (which can be referred to as a forage processing assembly 211 and can include for example a disc mower) attached to tractor 210, and a control system 212. Though the description of FIG. 2 primarily relates to a tractor with a pull-type mower-conditioner, it can be readily appreciated that a windrower could be used instead to accomplish the mowing and conditioning, with the windrower substituting in place for tractor 210 and the header forming the mower-conditioner substituting for mower-conditioner 211 (the sensors, actuators, and actuated structures for tractor 210 and mower-conditioner 211 could be applied to such a windrower with a header, as can be appreciated). As is known, tractor 210 pulls mower-conditioner 211 and provides mechanical power to mower-conditioner 211 via a power take-off. The mechanical power provided via the power-takeoff can be distributed so as to drive portions of the mower-conditioner 211, such as a plurality of rotary discs with knives for cutting (mowing) the forage crop material and to drive at least one of the two rollers used to condition the forage crop material (these rolls can each be referred to as rolls instead). Mower-conditioner 211 can include the rotary discs for mowing, the rollers for conditioning the forage crop material (which can also be referred to as a crop mat at this point in the mowing-conditioning operation), a swath gate 234B, and a pair of windrow shields 235B. The rotary discs rotate so as to mow the standing crop material. The rollers are vertically disposed relative to one another and include a lower roller and an upper roller 232B, the cut forage crop material passing through these rollers and out the rear of the mower-conditioner 211 onto the ground. The upper roller 232B can be adjusted vertically relative to the lower roller so as to vary a distance (which can also be referred to as a roller gap, or a roll gap) between the upper roller 232B and lower roller, so as to vary the amount of pressure applied by the rollers to the crop mat passing between the rollers. Further, a tension of the upper roller 232B can be adjusted, such as by way of increasing or decreasing the tension on a tension member 233B disposed above the upper roller 232B, so as also to vary the amount of pressure applied by the rollers to the crop mat passing between the rollers. The swath gate 234B, which can be substantially horizontal, can be provided downstream of the two rollers, so as to control a vertical component of the trajectory of the forage crop material exiting the rollers. The swath gate 234B can pivot about a transversely extending horizontal axis and thereby be adjusted so as to control this trajectory. The windrow shields 235B, which can oppose one another and also be positioned downstream of the rollers, can control the width (a horizontal component) of airborne forage crop material, so as to control a width of a windrow, and these windrow shields 235B can be pivoted about a respective vertical axis and thereby be adjusted so as to control this width.

The control system 212 of work equipment 101 can include a plurality of sensors 221, 222, 223, 224, 225, 226, 227, 228, 267, a plurality of actuators 231A, 232A, 233A, 234A, 235A, at least one input device (not specifically shown but understood to be a way to input information into controller 213), and a controller 213, each of these sensors and actuators being operable coupled with controller 213. The plurality of sensors can include at least one of sensors 221, 222, 223, 224, 225, 226, 227, 228, 267. Sensor 221 detects a speed (an actual condition of mower-conditioner 211, such as in revolutions pers minute) of the rotary discs and can be positioned at any suitable location, for example, near a power take-off shaft extending along an arm between from tractor, near a rotating shaft serving as a group all of the rotating discs, near a rotating shaft serving only a group of the rotating discs that is less than all of the rotating discs (resulting in a plurality of sensors 221), or near a rotating shaft serving an individual rotating disc (resulting in a plurality of sensors 221).

Sensor(s) 222 detect the distance (that is, the roller gap) between the lower roller and the upper roller 232B (an actual condition of mower-conditioner 211) and can be positioned at any suitable location, for example, on a frame or the like of mower-conditioner 211 near the roller gap. Alternatively or additionally thereto, sensor(s) 222 may include at least one sensor (222) (which can also be referred to as a roller gap sensor(s)) associated with each actuator 232A (below) (which may be referred to as a roller gap actuator 232A). Sensor(s) 222 may include a position sensor within actuator 232A and/or a position sensor, such as a potentiometer, operably connected to a plurality of rigid arms via a link (referenced below). Each such position sensor may sense a position of a respective roller gap actuator 232A. Each such potentiometer may measure a rotational movement of the rigid arm, and thereby the translational movement of an upper roller 232B of mower-conditioner 211. Upon receiving the signals from the potentiometer, controller 213 (below) may calculate the distance (the roller gap, which can also be referred to as a roll gap) between the lower and upper rollers (which can also be referred to as rolls, or conditioning rolls) of mower-conditioner 211 based upon a measured rotation of the rigid arms. Sensor(s) 222 and their operation here are substantially described in U.S. patent application Ser. No. 17/324,810, entitled "AUTOMATED ROLL CONDITIONER ADJUSTMENT SYSTEM FOR AN AGRICULTURAL HARVESTING MACHINE", filed May 19, 2021, which is incorporated herein by reference.

Sensor(s) 223 can detect and thereby measure any suitable variable associated with an amount of tension on the tension member 233B (an actual condition of mower-conditioner 211), such as an angular position of an end of, a linear position of an end of, or an amount of torsion of the tension member 233B (an actual condition of mower-conditioner 211), or, alternatively, an amount of pressure exerted between the rollers in the roller gap (an actual condition of mower-conditioner 211). Sensor 223 can be positioned at any suitable location, for example, at an end of the tension member 233B. Alternatively or additionally thereto, sensor(s) 223 may include at least one tension sensor associated with a tension actuator 233A. For example, the at least one tension sensor 223 may include a position sensor located within a tension actuator 233A and/or a position sensor, such as a potentiometer, operably connected to the tension member 233B via a link (referenced below in connection with tension actuator 233A and tension member 233B). The position sensor may sense the position of the tension actuator 233A. The potentiometer may measure a rotation of the tension member 233B. Sensor(s) 223 and their operation here are substantially described known, as described in U.S. patent application Ser. No. 17/324,810 (above).

Sensor 234 can detect a position of the swath gate 234B (an actual condition of mower-conditioner 211) so as to correspond to its angular position about a horizontal, transversely extending pivot axis and can be positioned at any suitable location, such as on a frame of mower-conditioner 211. Sensor 235 (which can be two sensors) can detect a position of a respective windrow shield 235B (an actual condition of mower-conditioner 211) and can be positioned at any suitable location, such as on a frame of mower-conditioner 211. Thus, regarding sensors 221-225 (each of which is a first forage processing assembly condition sensor), sensors 221-225 are configured for sensing a first actual condition (as described above) of the first forage processing assembly 211 and thereby for outputting a first actual condition signal associated with the first actual condition of the first forage processing assembly 211.

Sensor 226 (which can be a plurality of sensors 226) can detect a yield passing through mower-conditioner 211, the yield being, for example, the quantity of the crop material (measured in terms of mass, or weight for instance, at discrete locations within the field being harvested, within a specific section of a field, and/or for the field as a whole). Sensor 226 can be positioned at any suitable location, such as on the swath gate 234B, and can be in any form. For example, sensor 226 can be a transducer that measures a force or load of the crop material hitting against the swath gate 234B as the crop material passes by the swath gate 234B, which can be dependent upon the angular position of the swath gate 234B. Thus, sensor 226 is a first forage processing assembly forage crop material yield sensor 226 configured for sensing an actual forage crop material yield during the first forage processing operation (such as mowing-conditioning) and for outputting an actual forage crop material yield signal associated with the actual forage crop material yield. More specifically (according to an embodiment of sensor 226), sensor 226 can be configured to measure the force or load of crop material striking the swath gate 234B of mower-conditioner 211 in order to calculate the mass of crop passing through mower-conditioner 211 and thereby to determine the crop yield and also to create a yield map (in conjunction with a position sensor associated with either mower-conditioner 211 or the agricultural vehicle to which mower-conditioner 211 is attached, this position sensor optionally being sensor 228), showing the yield at discrete portions on the field (at whatever point along the travel path of the agricultural equipment that is desired, such as every meter, 5 meters, 10 meters, and so on), in various sections of the field, and/or in the field as a whole. Further, yield can be a function of moisture content (sensed by way of sensor(s) 227, below), when dry matter content is of interest, such that moisture content can be subtracted from the overall yield content to obtain yield in terms of dry matter content, this calculation being performed by any associated controller). One or more of sensor 226 can be employed in association with swath gate 234B. Further, sensor 226 can be used in conjunction with a position sensor 1080. This position sensor 1080 can be an angular position sensor 1080 attached to or otherwise coupled with a frame 1069 or other suitable structure of mower-conditioner 211, so as to be able to detect an angular position of swath gate 234B or a tube 1070 to which swath gate 234B is attached, the tube being attached to or coupled with frame 1069 and forming a pivot about which swath gate 234B can pivot relative to frame 1069. Thus, the position sensor 1080 is configured for detecting a position of crop-engaging device 234B and thereby for outputting a position signal associated with the position of the crop-engaging device 234B to an associated controller (such as controller 213). A further description of sensor 226 is provided below in connection with FIGS. 10-11. Further, sensor 226 and sensor 1080 and their operation here are substantially described in U.S. patent application Ser. No. 17/488,521, entitled "MOWER-CONDITIONER MACHINE WITH SENSING OF CROP YIELD", filed contemporaneously herewith, which is incorporated herein by reference.

Figure 9:
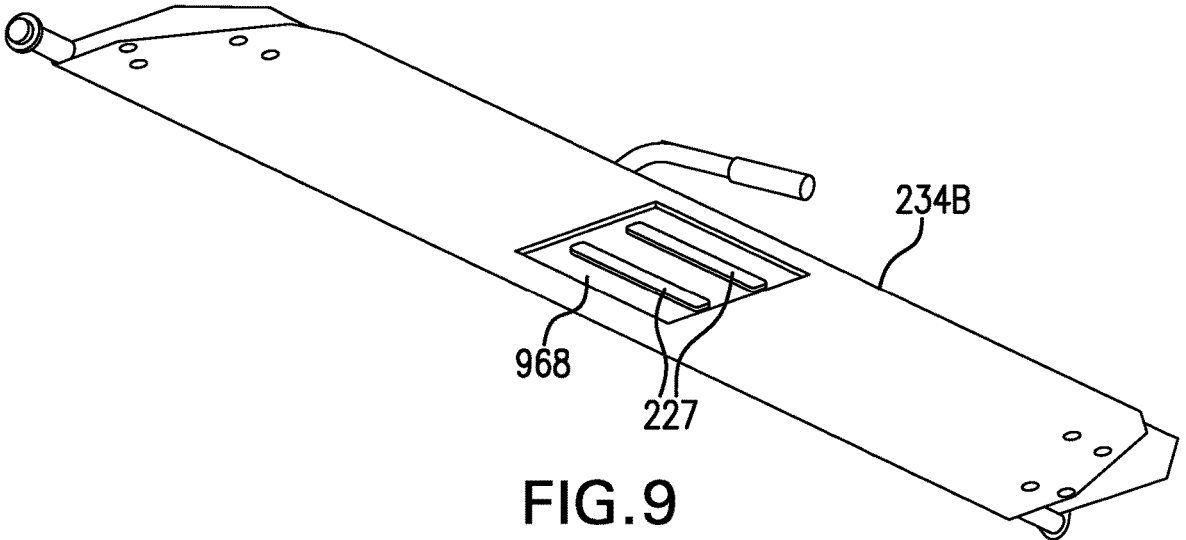
FIG. 9 illustrates a perspective view of a swath gate of a mower-conditioner of the agricultural work equipment of FIG. 2, with portions broken away, the swath gate having a moisture sensor attached thereto, in accordance with an exemplary embodiment of the present invention.

Sensor 227 (which can be a plurality of sensors 227) can detect a moisture content of the forage crop material (that is, the converse of the dry matter content) passing through mower-conditioner 211, and can be positioned at any suitable location, such as on the swath gate 234B. Thus, sensor 227 is a first forage processing assembly forage crop material moisture sensor configured for sensing an actual forage crop material moisture during the first forage processing operation (such as mowing-conditioning) and for outputting an actual forage crop material moisture signal associated with the actual forage crop material moisture. Each moisture sensor 227 may be connected to a respective crop-engaging member. Sensor 227 can be connected to the crop-engaging surface, i.e., underside, of swath gate 234B. Sensor 227 may be embedded within the swath gate 234B so that each sensor 227 is flush with the crop-engaging surface of the swath gate 234B. Each moisture sensor 227 may be in the form of one or more electrodes for sensing a voltage drop between the electrodes or between one electrode and the ground, e.g. a component of the swath gate 234B and/or the frame of moisture-conditioner 211 which is grounded, and/or a wave-ranging sensor, e.g. a LIDAR sensor or infrared sensor. It should be appreciated that one or more moisture sensors 227 may optionally also be connected to one or both of the windrow shields. For instance, a moisture sensor 227 may be connected to the inner, crop-engaging surface of one of the windrow shields. However, alternatively, only the swath gate 234B may have moisture sensors 227 connected thereto. Additionally, the one or more moisture sensors 227 may be fitted within a mount, such as an electrically insulated mount, that connects the moisture sensor(s) 227 to the swath gate 234B. In more detail, swath gate 234B may have a through-hole or recessed portion in which the mount is seated. The mount may include a plastic material. For example, on the underside of swath gate 234B can be two sensors 227, each sensor 227 being spaced apart from one another within mount 968, as shown in FIG. 9. In the embodiment wherein the one or more moisture sensors 227 include the electrode(s), a current may pass between the electrodes and/or ground and through the forage crop material as the stream of forage crop material passes over the electrode(s) in the swath gate 234B. Hence, the voltage difference or drop which results from the current flow through the crop material will ultimately determine the moisture content of the crop material. Upon receiving the moisture data from the moisture sensor(s) 227, controller 213 (and/or a data center, which may be associated with computing machine 108, or a cloud-based device) may determine the moisture content of the crop material by employing a lookup table or algorithm that correlates the moisture data to a particular moisture content of the forage crop material. Further, data from moisture sensor 227 and location sensor 228 (below) can be evaluated within controller 213, for instance, to generate a moisture content map, and to determine estimated dry-down times, so as to help determine the optimal time for a next forage processing operation. Further, the map can be segregated by fields or portions of fields, to help an end user determine which fields to perform a subsequent forage processing operation on first, second, and so on. Sensor(s) 227 and their operation here are substantially described in U.S. patent application Ser. No. 17/141,651, entitled "MOWER-CONDITIONER MACHINE FOR SENSING MOISTURE CONTENT OF CROP MATERIAL", filed Jan. 5, 2021, which is incorporated herein by reference, as well as in U.S. patent application Ser. No. 17/488,521, entitled "MOWER-CONDITIONER MACHINE WITH SENSING OF CROP YIELD", filed contemporaneously herewith, which is incorporated herein by reference and which claims priority to U.S. patent application Ser. No. 17/141,651.

Sensor 228 can be a Global Positioning System (GPS) that detects, records, and/or outputs a position of the GPS—such as by way of GPS coordinates—to a respective controller (such as controller 213) of the path that tractor 210 has traveled across the field so as to ascertain the swath or windrow positions 220 on the field, which can be used for subsequent autonomous forage processing operations, which can employ an autonomous tractor. The GPS 228 can be in the cab of tractor 210, for example, or on the mower-conditioner 211 itself. If the GPS 228 is in the cab of tractor 210, and mower-conditioner 211 is offset laterally relative to tractor, a factor can be employed by controller 213 to determine the swath or windrow position relative to tractor 210.

The plurality of actuators can include at least one of actuators 231A, 232A, 233A, 234A, 235A, which correspond to sensors 221, 222, 223, 224, 225, respectively. Actuator 231A can be configured for adjusting the speed of one or more of the cutting rotary discs 231B of mower-conditioner 101, and actuator 231A can include any suitable structure, for example, any suitable gearing (or way to change gears) to increase or decrease the speed of all the rotary discs 231B as a group, a group of the rotary discs 231B less than all of the rotary discs 231B, or individual rotary discs 231B (for example, such gearing can be on tractor (though FIG. 2 shows actuator 231A as a part of mower-conditioner 211), or on mower-conditioner 211. According to an alternative embodiment, as indicated above rather than having rotary discs 231B as a cutting apparatus of mower-conditioner 211, the cutting apparatus could be formed as a sicklebar with reciprocating knives, as is known in the art (thus, element 231B could be reciprocating knives, the speed of which could be adjusted as is known in the art, such as by setting the knife speed in a cab of the tractor or windrower, or by adjusting any suitable gearing and/or shafts).

Sensor(s) 267 is a crop characteristic sensor and is configured for sensing crop characteristics, including the type of crop in the field and the maturity level of the crop. Sensor 267 can sense information concerning the quality of the crop (that is, the forage), such quality being associated with the feed quality and/or nutritional quality (as discussed above). Sensor 267, by way of example and not limitation, can be in the form of any desired sensor, such as an optical sensor, e.g. camera, or a wave-ranging sensor, e.g. LIDAR sensor, or a near infra-red (NIR) sensor. Sensor 267 can be mounted, for example, to a frame of an associated attachment or implement, such on the front of a mower-conditioner (whether as a trailing implement or a header), or on the tractor or other self-propelled agricultural vehicle. Sensor can be so mounted to the front of the attachment or vehicle, or any other place that can enable the sensing of the forage. In this way, sensor 267 can provide (to an associated controller) additional, real-time agronomic data so as to supplement the input of agronomic data 215 (below). This real-time data from sensor 267 can supplement agronomic data 215 (and thus can be included in agronomic data 215 in the remaining embodiments of the present invention and figures herein). Further, though sensor 267 is shown only in conjunction with FIG. 2, it can be appreciated that sensor 267 can be used with any embodiment of the present invention described and/or shown herein. Sensor 267 and its operation here is substantially described in U.S. patent application Ser. No. 17/141,651, entitled "MOWER-CONDITIONER MACHINE FOR SENSING MOISTURE CONTENT OF CROP MATERIAL", filed Jan. 5, 2021, which is incorporated herein by reference, as well as in U.S. patent application Ser. No. 17/488,521, entitled "MOWER-CONDITIONER MACHINE WITH SENSING OF CROP YIELD", filed contemporaneously herewith, which is incorporated herein by reference and which claims priority to U.S. patent application Ser. No. 17/141,651.

Figure 5:
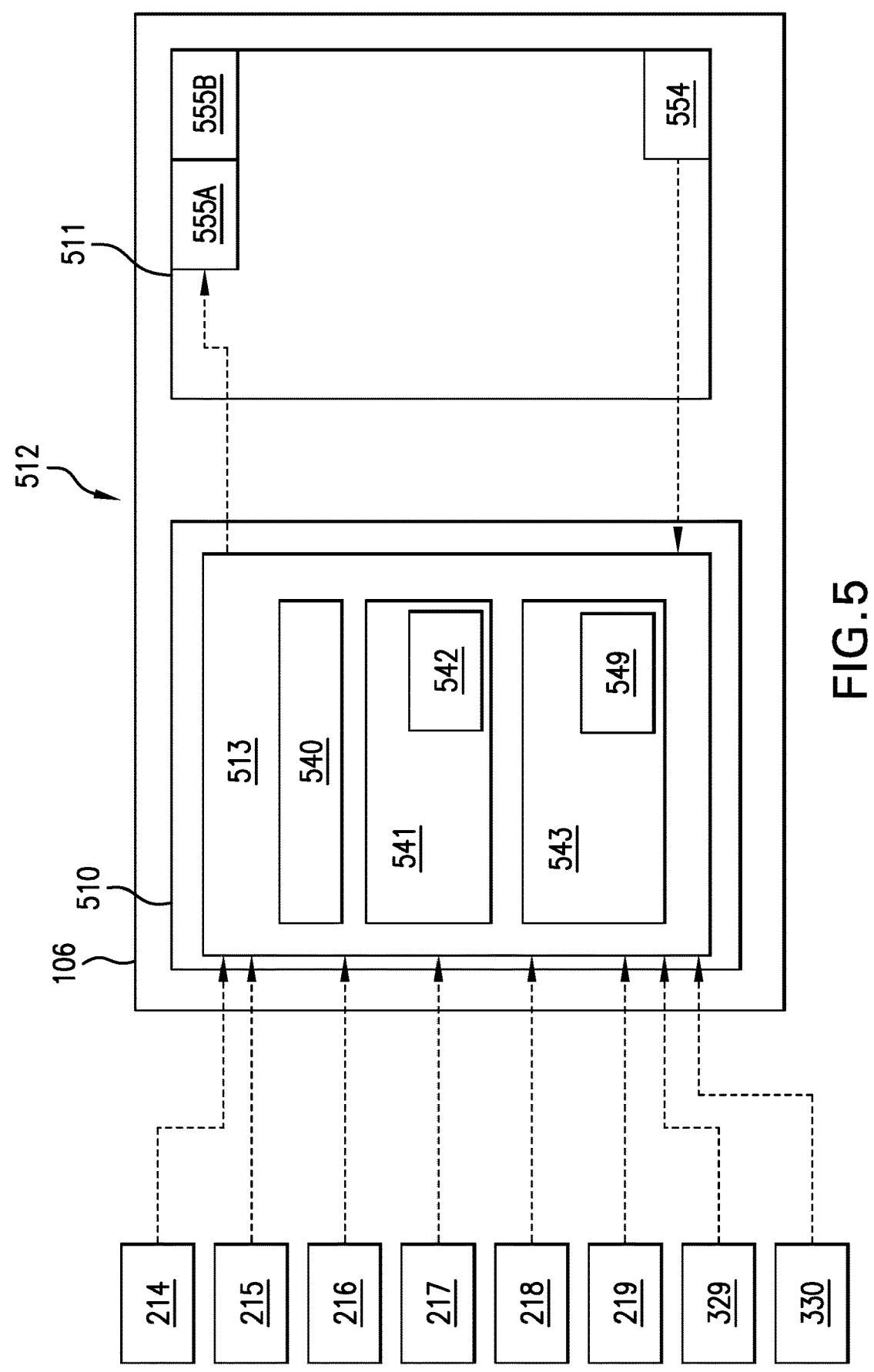
FIG. 5 illustrates a schematic view of another agricultural work equipment of the agricultural system of FIG. 1, in accordance with an exemplary embodiment of the present invention.

Actuator 232A (which can be a plurality) can include any suitable actuator (or actuators) for raising or lowering, for example, the upper roller 232B relative to the lower roll, can be, for example, a linear actuator that is a fluid actuator (such as a hydraulic actuator (i.e., hydraulic cylinder) or a pneumatic actuator (i.e., pneumatic cylinder)), an electric actuator (such as an electromechanical actuator or an electrohydraulic actuator), an electronic actuator, a rotary motor, and/or a mechanical actuator (which can include cables, for instance), and can be positioned in any suitable location, such as on or near a frame of mower-conditioner 211 so as to raise and lower the upper roller 232B, for instance. Actuator 232A and upper roller 232B and their operation here are substantially described in U.S. patent application Ser. No. 17/324,810 (above). For example, a roller gap mechanism can generally include control rods and roller gap actuator(s) 232A that are operably connected to the control rods via linkage mechanisms. The roller gap mechanism sets and adjusts the size of the roller gap. The control rods control the sliding or floating movement of the upper roller 232B. The control rods extend vertically in between the linkage mechanisms and the upper roller 232B. The control rods are respectively pivotally connected to the linkage mechanisms at their upper ends. The control rods are respectively and slidably connected to the lateral ends, i.e., end brackets, of the upper roller 232B at their lower ends. More particularly, each control rod extends through an opening of a respective slider coupling. Furthermore, each control rod has an end member that engages with the bottom of the respective slider coupling. Hence, each end member defines a mechanical stop for setting a bottom limit of travel of the upper roller 232B. In this regard, the structural relationship between the slider couplings and the end members define a one-way floating or sliding movement of the upper roller 232B. Thus, the control rods allow the upper roller 232B to upwardly float relative to its end members and independent of the roller gap actuators 232A (FIG. 5). Yet, the substantially vertical travel of the control rods, through actuation of the roller gap actuators 232A, allows the end members to raise or lower the slider couplings and thereby pivot the upper roller 232B. The control rods may be in the form of any desired rods, bars, or links. The end members may be in the form of any desired members that have a greater width or circumference than the body of the control rods for engaging with the slider couplings. For example, the end members may be in the form of nuts or bulbous end-caps. The control rods may include any desired material. The roll-gap actuators 232A may pivot the upper roller 232B about its axis in order to adjust the roller gap. Thereby, the roller gap actuators 232A may pivot the upper roller 232B in between a maximum roller gap size and a minimum roller gap size. Each roller gap actuator 232A can be mounted on a frame (or sub-frame) at one end and is operably connected to a respective control rod via a linkage mechanism at the other end. The roller gap actuator 232A are respectively connected to the tension arms (referenced below in connection with actuator 233A and tension member 233B) only through the control rods. The roller gap actuators 232A are located above, i.e., vertically upward of, the tension arms. The roller gap actuators 232A are independently movable for tilting the upper roller 232B in a non-parallel configuration relative to the lower roller. In other words, the roller gap actuator 232A can set the roller gap to be at different positions on the left-hand side and the right-hand side of the lower and upper rollers of mower-conditioner 211. Thus, the roller gap actuators 232A may accommodate an uneven wear on one or both of the lower and upper rollers of mower-conditioner 211. Each roller gap actuator 232A may be in the form of any desired actuator, as mentioned above, such as a hydraulic cylinder.

Actuator 233A can include any suitable actuator (or actuators) for increasing or decreasing a torque on the tension member 233B so as to respectively decrease or increase a roller pressure applied in the roller gap, such as any linear or rotary actuator (such as a hydraulic cylinder), which can be a fluid actuator, an electric actuator, an electronic actuator, a rotary motor, and/or a mechanical actuator, and can be positioned in any suitable location, such as on or near a frame of mower-conditioner so as to provide any necessary torque. Actuator 233A and tension member 233B and their operation here are substantially described in U.S. patent application Ser. No. 17/324,810 (above). For example, a tension mechanism can generally include tension member 233B, tension arms, tension actuator 233A operably connected to the tension member 233B by a linkage mechanism, and a biasing member. The tension mechanism can set and adjust a tension force on the upper roller 232B. The tension member 233B may be rotated by the tension actuator 233A for applying a desired tension or biasing force onto the tension arms, which in turn can transmit the tension force onto the upper roller 232B. The tension member 233B is operably connected to the upper roller 232B by way of the tension arms. The tension member 233B may be located above and substantially parallel to the upper roller 232B. The tension member 233B may be in the form of a tension or torsion tube or bar, or, alternatively, of any desired elongated member(s), such as a multi-section bar. Since the tension member 233B couples the tension arms together, the tension member 233B controls the rotational position of the tension arms. The tension member 233B may include any desired material, such as stainless steel. The tension arms can operably connect the tension member 233B to the upper roller 232B. The tension arms may include rigid arms and pivot arms. The rigid arms can be respectively connected to each end of the tension member 233B. The pivot arms can be respectively and pivotally connected in between the rigid arms and the lateral ends, i.e., end brackets, of the upper roller 232B. The tension arms may be in the form of any desired arms, links, or bars and may include any desired material. The tension actuator 233A can rotate tension member 233B in order to adjust the tension force applied by the tension member 233B onto the upper roller 232B. The tension actuator 233A can be operably connected to the tension member 233B via a linkage mechanism. The tension actuator 233A may dually adjust the tension force on the upper roller 232A and the roller gap. In other words, due to the geometry of the tension mechanism, tension actuation may rotate the tension arms from a maximum roll tension position to a minimum roll tension position, i.e., maximum roller gap opening setting. In the maximum roll tension position, the lower and upper rollers of mower-conditioner 211 can be pushed together with maximum tension member 233B rotation which may in turn minimize the roller gap. In the minimum roll tension position, the tension arms can be rotated to pull the lower and upper rollers away from one another which may in turn fully open the roller gap. Hence, the tension actuator 233A may rotate the tension arms in a first direction to apply roll tension to the lower and upper rollers or a second direction to lift the upper roller 232A to the position of maximum roll opening, which may be equal to the maximum roll opening possible. This maximum roll opening may be greater than the typical opening from standard operational settings. Tension actuator 233A may be in the form of any desired actuator, as mentioned above, such as a hydraulic cylinder. The linkage mechanism can convert a linear movement of the tension actuator 233A into a rotational movement for rotating the tension member 233B. The linkage mechanism may include one or more link. For instance, the linkage mechanism may include a single link that is pivotally connected to the tension actuator 233A at one end and rigidly connected to the tension member 233B at the other end. The link may include an approximate "L"-shape. It can be appreciated that the one or more links may include any desired linkage members and any desired material.

Actuator 234A can include any suitable actuator (or actuators) for pivoting or otherwise raising and lowering the swath gate 234B, such as any linear or rotary actuator that is a fluid actuator, electric actuator, electronic actuator, and/or mechanical actuator, and can be positioned in any suitable location, such as on or near a frame of mower-conditioner 211. Actuator 235A can include any suitable actuator (or actuators) for pivoting or otherwise moving a respective windrow shield 235B inward or outward (relative to a horizontal midline running fore-to-aft of mower-conditioner), such as any linear or rotary actuator that is a fluid actuator, electric actuator, electronic actuator, and/or mechanical actuator, and can be positioned in any suitable location, such as on or near a frame of mower-conditioner 211.

The input device (not specifically labeled in FIG. 2), which can be a plurality of input devices each of which can be a different kind of input device, is configured for inputting information into a respective controller (such as controller 213) in any suitable way, whether by the operator or automatically by way of software programming from, for example, remotes sources. The input device, thus, can include, for example, a keyboard or a touchpad of a computing machine, which can be maintained in a cab of tractor, or a USB port of such computing machine configured for receiving, for example, a memory stick or like device for storing information thereon and inputting information into the computing device. Alternatively, the input device can be any device of the tractor's computing machine configured for receiving information by wire or wirelessly, such as on a local area network, a metropolitan area network, or a wide area network, such as the Internet. For instance, the input device receives information from any of sensors 221-228.

The information that can be input into input device includes at least the following: weather data 214; agronomic data 215; field data 216; yield data 217; moisture data 218; the forage processing operations that will take place 219; and swath or windrow position 220. Such information includes any information that can help a forage grower/harvester predict when (date and time) is the most optimal time to perform any forage processing operation and know how to optimize initial settings on the agricultural work equipment (such as agricultural work equipment 101-107) for any forage processing operation (such optimization of settings can be done automatically according to an embodiment of the present invention). Such settings include what has been discussed above, namely, speed of rotary discs, position of upper roller 232B relative to lower roller, tension of tension member 233B, position of swath gate 234B, and position of windrow shield 235B. Regarding weather data 214, weather data 214 includes historical data and models, current weather data, and future weather data (that is, weather forecasts). The historical, current, and future weather data pertains to a particular location, from broad geographical areas to more focused geographical areas (such as country, region, state, county, city, town, and/or field, by way of any suitable boundary indicators, such as GPS coordinates). Historical weather data and models incudes information about past seasons and/or years for the location of interest, which can help predict the weather for a corresponding date/time in the current year or season. Such data can include, for example, temperature, amount of rainfall, humidity, dew point, windspeed and direction, and degree of sunshine (as opposed to cloudiness) by dates and times. Such historical information can include not only such data of prior years and seasons but also such data of a current year or season (such as rainfall during curing), which can help predict timing and conditions and make appropriate settings not only with respect to the first cutting of a given season but also subsequent forage processing operations. Current and future weather data can include the same categories of information for current and future dates and times. Such historical, current, and future weather data can be accessed, for instance, by any publicly available resources, such as Internet resources. Regarding agronomic data 215, such data 215 can include plant species and variety of the crops (generally, crop type) that are planted in a given field. Such data 215 can include maturity prediction models, to help predict when the particular crop will reach various stages of maturation. Data 215 can also provide information not only concerning crop type but also feed quality and/or nutritional quality of the crop (that is, the forage). Further, such data 215 can also employ the Growing Degree Day method for crop management decisions so as to determine when to harvest the forage crop material, such method being well-known. Data 215 can be reference data from any available source and need not be sensed and received real-time by an agricultural work equipment sensor sensing a plant characteristic (for example, stem diameter) in a field on which to conduct a forage processing operation. Regarding field data 216, field data 216 includes information identifying the location of interest, as described with respect to broad geographical areas down to specific fields of interest, or even specific portions of the fields. As such, field data 216 can also include field size. Field data 216 can include topographical information, such as elevation, as well as data concerning the soil within the respective fields. Such soil data can include test information concerning the nutrients within the soil of specific fields. Field data 216 can also include information concerning nearby bodies of water, as well as historical fertilizing information, such as when types of fertilizer have been applied to which fields. Regarding yield data 217, yield data 217 includes historical yield data (from prior years or seasons or prior forage processing operations of the current year or season) and current yield data. For example, historical yield data can include the tons per acre of forage crop material mowed and conditioned on a given date and time in the past. Current yield data can include the yield during a real-time forage processing operation, such as mowing-conditioning. Such yield data can be generated by yield sensor 226 on the swath gate 234B of the mower-conditioner 211. Regarding moisture data 218, moisture data 218 includes historical moisture data (from prior years or seasons or prior forage processing operations of the current year or season) and current (i.e., real-time) moisture data during a current forage processing operation, such moisture data being the forage crop material moisture content (which is the converse of dry matter content). Such moisture data can be generated by the moisture sensor 227 on the swath gate 234B of the mower-conditioner 211. Regarding the forage processing operations to take place in a given season or cycle within a season (that is, the anticipated forage processing operations 219), an operator can input either the type of forage processing that is anticipated for the upcoming cycle (which would imply the forage processing operations needed to achieve this type) or the series of forage processing operations that are anticipated in that particular cycle (for example, mowing-conditioning, tedding, raking, and baling, or mowing-conditioning, chopping, ensiling). Further, the operator can input not only the anticipated upcoming forage processing operations for the upcoming cycle but also the anticipated upcoming forage processing operation (that is, the forage processing operation that is to occur next, such as mowing-conditioning). Regarding the swath or windrow position 220, swath or windrow position 220 can include GPS coordinates of a path of tractor 210, for example, which can correspond to the swath or windrow laid down by the mower-conditioner 211 (a value can be used to account for an offset when mower-conditioner 211 is laterally offset from tractor, so as to more precisely determine the location of the swath or windrow). All data inputs described herein can be shared within the agricultural system 100 and can be stored within individual controllers referenced herein (i.e., 213, 313, and so on), or in a cloud-based system, or at a designated data center (not specifically shown), all of which can be a part of agricultural system 100.

Controller 213 can include be a single controller or a plurality of controllers linked together so as to be able to communicate with each other and to prioritize tasks between each other, as is well-known in the art. For example, controller 213 can include a controller of tractor and any controller of mower-conditioner, controller 213 in FIG. 2 being shown schematically to be controller of tractor 210 but being understood to include both controller of tractor 210 and any controller of mower-conditioner 211 and thus being understood to be controller 213 of work equipment 101; even so, controller 213 can be spoken of a being controller of tractor, as a sort of master controller. Controller 213 is operatively coupled with each of sensors 221-228. Generally speaking, controller 213 can be configured for controlling a variety of functions of tractor 210 and mower-conditioner 211.

More specifically, with respect to an initial (first) forage processing operation (mowing-conditioning) and prior to beginning the actual mowing-conditioning, controller 213 is configured for (a) receiving at least one first actual condition signal respectively from at least one of sensors 221-225, 267, (b) determining a first adjustment signal based at least in part on the actual condition signal from at least one of sensors 221-225, 267 and at least one predicted forage crop material condition associated with a first forage processing operation, and (c) outputting, as a result of (a) and (b), the first adjustment signal to at least one of actuators 231A-235A and thereby for initially adjusting, prior to beginning the first forage processing operation, a first device (one of devices 231B-235B) of the first forage processing assembly (mower-conditioner 211). Regarding (c) first, upon determining the first adjustment signal, controller 213 outputs this signal to at least one of actuators 231A-235A, which then makes an initial adjustment of at least one of the first devices 231-235B, such that devices 231-235B are ready to begin mowing-conditioning in a way that facilitates maximizing yield and feed value, such as helping to facilitate dry-down of the forage crop material. Regarding (b), the first forage processing operation in (b) can be mowing-conditioning by way of agricultural equipment 101, though any other suitable forage processing operation can be employed instead of or in addition to mowing and conditioning (though mowing-conditioning is discussed herein as the first forage processing operation). Further, the at least one predicted forage crop material condition associated with, for instance, mowing-conditioning (the first forage processing operation) can include (i) when (date and time) the forage crop material is optimally ready to be mowed, (ii) a predicted yield of the forage crop material, the yield being associated with quantity (i.e., tonnage per acre) of the forage crop material, which itself can be a function of an average height of the forage crop material per acre, the average density per acre of the forage crop material, and/or the average moisture content of the forage crop material per acre, and (iii) a predicted moisture content of the forage crop material per acre. The predicted forage crop material condition (including i, ii, and iii) can be determined by controller 213 by way of a predetermined algorithm stored in controller 213, which considers various inputs, including inputs mentioned above, namely, weather data 214, agronomic data 215, field data 216, yield data 217 (more specifically, historical yield data), moisture data 218 (more specifically, historical moisture data), and the anticipated forage processing operation 219. The predicted forage crop material condition is thus a factor in determining a target condition associated with the actual condition that sensors 221-225, 267 (of (a)) are sensing, the first adjustment signal (of (b)) thus being based upon the actual condition and the target condition. Significantly, all of the input factors 214-219 (less current/real-time yield and moisture data) are evaluated and weighed by controller 213 when determining the predicted forage crop material condition with respect to the initial settings referenced (231A/B-235A/B).

Further, knowing the predicted forage crop material condition can help optimize such dry-down in various ways. For instance, first, knowing when the forage crop material should be mowed (the optimal date and time) can suggest a proper setting for any of the devices 231-235B (which are associated with disc speed, roller gap, tension member tension or roller pressure, swath gate position, and/or windrow shield position). For instance, mowing on the precise date at the precise time determined by the controller 213 based on weather, agronomic, and field conditions can suggest setting each device at a mid-range position (i.e., fifty percent of maximum) or, otherwise, a normal operating position. For example, with respect to disc speed, mowing early (before the optimal date and time) or late can suggest a disc speed of slower or faster than normal, respectively. Regarding roller gap, mowing early can suggest a roller gap less than fifty percent or normal (or late, greater than), presumably having less quantity of forage crop material. Regarding roller pressure or tension member tension, mowing early can suggest a setting of less than fifty percent or normal (or late, greater than). Regarding swath gate and windrow shield positions, mowing early can suggest a lower quantity and thus a narrower swath/windrow (while a higher quantity can suggest a wider swath) and thus a position of the swath gate that provides for a higher trajectory (so as to strike the windrow shields) and of the windrow shields that are relatively narrow, though this may be further adjusted by, for example, weather predictions, which may forecast windy and cloudy conditions after cutting, which may suggest forming a high and fluffy windrow (and thus an even higher position of the swath gate (if possible) and a narrower position of the windrow shields (if possible), which can be optimal for a cloudy and windy conditions) rather than a wide and thin swath (which can be optimal for sunny and low wind conditions, and thus a low position of the swath gate and a wide position of the windrow shields, so that the crop mat does not strike the windrow shields as much, if at all). Further, historical forage crop yield and moisture data can also factor into such timing relative to a predicted forage crop condition, or can serve as independent predicted forage crop conditions, which are factored into determining a target for the specific setting with respect to the conditions of disc speed, roller gap, tension member tension or roller pressure, swath gate position, and/or windrow shield position. For instance, high historical yield can suggest faster speed for rotary discs, a wider roller gap, less tension member tension or roller pressure, and possibly a wide and thing swath or a high and fluffy windrow (depending upon weather conditions). High historical moisture content can suggest faster speed for rotary discs, a narrower roller gap, more tension member tension or roller pressure, and possibly a wide and thin swath or a high and fluffy windrow. On the other hand, the anticipated forage processing operations can further adjust these settings.

Further, with respect to the first forage processing operation (such as mowing-conditioning) and after beginning the first forage processing operation (after the mower-conditioner 211 has been set-up for the mowing-conditioning and after beginning the actual mowing-conditioning of the standing forage crop material), controller 213 is configured for (a) receiving at least one of the actual forage crop material yield signal (from sensor 226) and the actual forage crop material moisture signal (from sensor 227), (b) determining a second adjustment signal based at least in part on at least one of the actual forage crop material yield signal and the actual forage crop material moisture signal, and (c) outputting, as a result of (a) and (b), the second adjustment signal to at least one of actuators 231A-235A and thereby for further adjusting, after beginning the first forage processing operation, the first device (one of devices 231B-235B) of the forage processing assembly (mower-conditioner 211). Stated another way, the adjustment of at least one of actuators 231A-235A, and thus also devices 231B-235B, occurs during operation of mower-conditioner 211, as mower-conditioner 211 is cutting and conditioning the forage crop material, based on the yield sensed by yield sensor 226 and/or moisture sensor 227. This current yield and moisture can be considered to be a subset of yield data 217 and moisture data 218. For instance, a high yield can suggest increasing rotary disc speed, increasing roller gap, possibly decreasing tension member tension (or roller pressure) so as to accommodate more forage crop material throughput, and moving toward either a wide and thin swath (one extreme) or a high and fluffy windrow (another extreme)(both extremes seeking to dry down a large quantity of forage crop material, through increased sun exposure and/or aeration). Further, all of the input factors 214-219 can be evaluated and weighed by controller 213 when making determinations with respect to the settings referenced (231A/B-235A/B) that can be made during operation of agricultural work equipment 101 (the operational settings). Further, controller 213 can use data from sensor 267 in conjunction with yield and moisture sensor 226, 227 to make the determination of (b) and render the output of (c).

In general, controller 213 can include a single controller (i.e., controller of tractor 210) or a plurality of controllers (controllers for tractor 210 and mower-conditioner 211), each of which may correspond to any suitable processor-based device(s), such as a computing device or any combination of computing devices (controller 213 is discussed in the collective and thus in the singular, which can be appreciated to include the single controller or the plurality of controllers). Thus, as shown in FIG. 2, controller 213 may generally include one or more processor(s) 240 and associated memory 241 configured to perform a variety of computer-implemented functions (e.g., performing the methods, steps, algorithms, calculations and the like disclosed herein). For instance, controller 213 may include a respective processor 240 therein, as well as associated memory 241, data 242, and instructions 243, each forming at least part of respective controller 213. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 241 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 241 may generally be configured to store information accessible to the processor(s) 240, including data 242 that can be retrieved, manipulated, created, and/or stored by processor(s) 240 and instructions 243 that can be executed by the processor(s) 240. In some embodiments, data 242 may be stored in one or more databases.

Accordingly, controller 213 receives certain inputs and transmits certain outputs. For example, controller 213 receives input signals as discussed above. Controller 213 can output the first adjustment signal(s) to actuators 231A-235A (associated respectively with devices 231B-235B) of mower-conditioner 211, based at least partly on inputs 214-219 stored in memory 241, on the predicted forage crop material condition(s), and on one or more first adjustment modules 244 formed in accordance with the algorithm and instructions 243 in controller 213, so as to adjust the associated actual condition to the associated target condition. Further, controller 213 can output the second adjustment signal(s) to actuators 231A-235A (associated respectively with devices 231B-235B) of mower-conditioner 211, based at least partly on the inputs 217, 218 (current yield and/or current moisture) stored in memory 241, and on one or more second adjustment modules 245 formed in accordance with the algorithm and instructions 243 in controller 213, so as to adjust the associated actual condition to the associated target condition.

Figure 3:
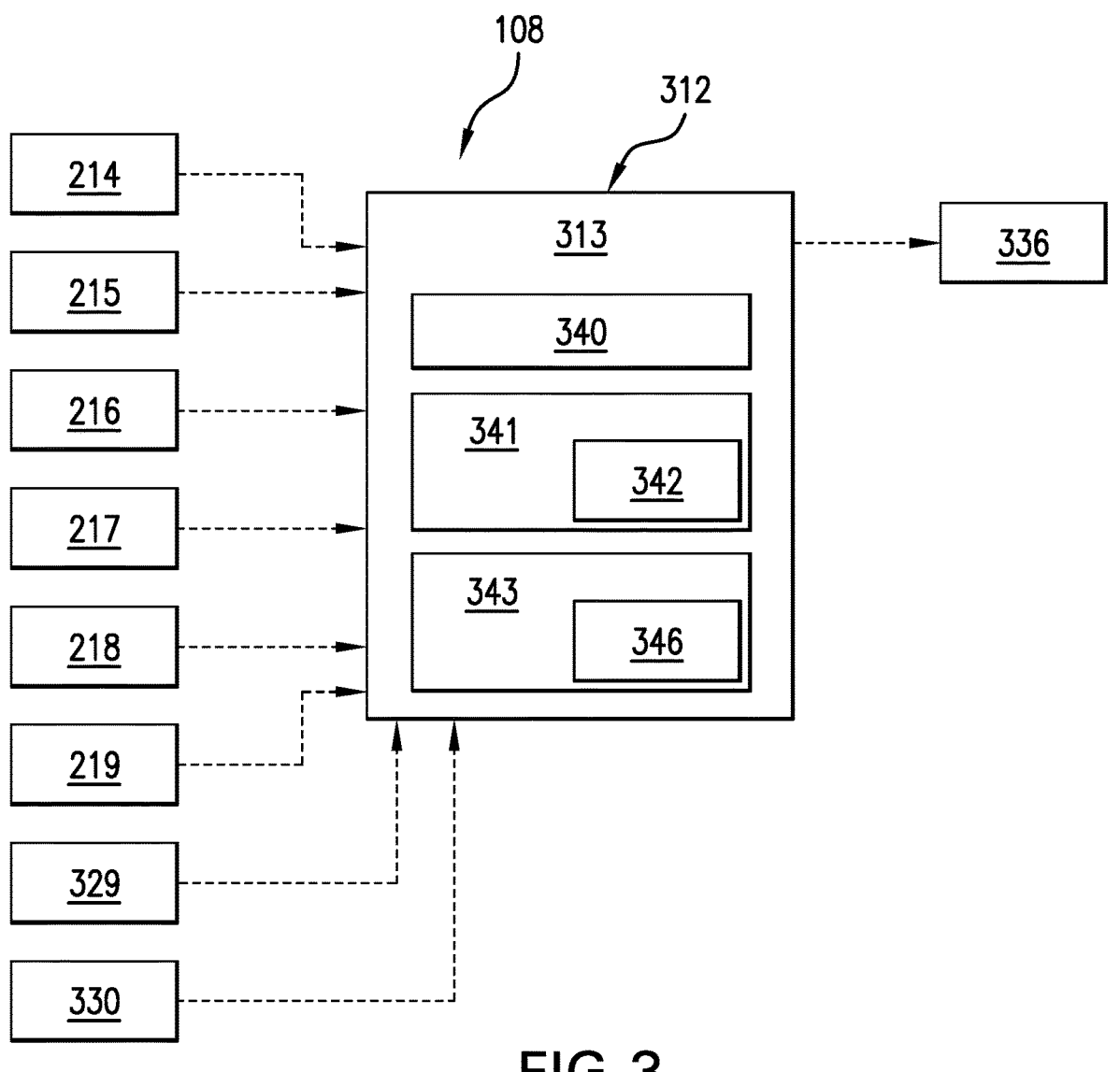
FIG. 3 illustrates a schematic view of a computing machine of the agricultural system of FIG. 1, in accordance with an exemplary embodiment of the present invention.

Referring now to FIG. 3, there is shown schematically computing machine 108, which can be a part of agricultural system 100, according to an embodiment of the present invention. Computing machine 108 includes at least one input device (such as a keyboard or keypad), at least one output device (such as a display device, such as a monitor or screen, or any other way to communicate data to other computing machines including a controller) and can communicate with other computing machines as indicated above (including controller 213). Computing machine 108 further includes control system 312 a controller 313 which is operatively coupled with controller 213 of mower-conditioner 211. Controller 313 is configured for (a) receiving (for instance, from controller 213) a final actual forage crop material yield 329 of a first forage processing operation (the mowing-conditioning described above) and a final actual forage crop material moisture 330 of the first forage processing operation, and (b) determining, employing an algorithm, when to conduct a second forage processing operation based at least in part on at least one of the final actual forage crop material yield 329 of a first forage processing operation (the mowing-conditioning described above) and the final actual forage crop material moisture 330 of the mowing-conditioning operation. The second forage processing operation, which is subsequent to the mowing-conditioning operation, can be, for example, tedding, raking, merging, baling, or chopping. After determining when (for example, a specific date and time) to conduct the second forage processing operation, controller 313 can display this date and time on any output device, such as a display device 336. Further, this date and time can be communicated by computing machine 108 to any other computing machine, such as a controller 213 of tractor 210, which can be used for the second forage processing operation. The final actual forage crop material yield 329 and moisture 330 of the mowing-conditioning stems from what is detected by the yield and moisture sensors 226, 227 described above in connection with the mowing-conditioning. The sense of "final" for this information means that controller 313 considers all of the yield and moisture data received from the immediately preceding mowing-conditioning operation, and this information can be packaged or summarized (by controller 213 or 313) in any suitable manner that can be useful for controller 313 and the overall harvesting operation(s). For instance, an average yield level and/or moisture level per field can be used by controller 313; alternatively or in addition thereto, an average yield level and/or average moisture level per section of a field can be used; alternatively or in addition thereto, discrete measurement yield levels and/or moisture levels along the path traveled by the respective work equipment across a given field can be used, wherein the discrete measurement levels can be spaced apart at a predetermined amount, such as every meter, five meters, ten meters, or whatever distance is so desired. Such yield and moisture data can be relevant in that, for example, high yield and moisture levels from the mowing-conditioning operation can suggest a relatively longer time between the next forage processing operation, depending upon what the next forage processing operation is. For example, if the second forage processing operation is baling, and a moisture level, for example, of the forage crop material lying on the ground of 15% is needed before baling, then a relatively longer may be needed before baling. As a further example, yield maps and moisture maps can be determined by controller 313, for example, from the yield and moisture data to aid in determining which fields or portions of fields to do next in terms of the next forage processing operation. Further, determination of this date and time can consider any of the factors mentioned above, such as weather data 214, agronomic data 215, field data 216, historical yield and moisture data 217, 218 (that is, prior to the first forage processing operation, the forage processing operation that will be the second forage processing operation), and the swath or windrow positions on the field, as any of these inputs have been updated since prior to the first forage processing operation (in other words, inputs 214-220 are not necessarily static, and can be constantly updated before, during, and after any and all of the forage processing operations). Further, controller 313 can use data from sensor 267 (which can be included in agronomic data 215) in conjunction with yield and moisture sensor 226, 227 to make the determination of (b).

Further, controller 313 may correspond to any suitable processor-based device(s), such as a computing device or any combination of computing devices. Thus, as shown in FIG. 3, controller 313 may generally include one or more processor(s) 340 and associated memory 341 configured to perform a variety of computer-implemented functions (e.g., performing the methods, steps, algorithms, calculations and the like disclosed herein). For instance, controller 313 may include a respective processor 340 therein, as well as associated memory 341, data 342, and instructions 343, each forming at least part of controller 313. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 341 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 341 may generally be configured to store information accessible to the processor(s) 340, including data 342 that can be retrieved, manipulated, created, and/or stored by processor(s) 340 and instructions 343 that can be executed by the processor(s) 340. In some embodiments, data 342 may be stored in one or more databases. Further, controller 313 can output the date and time of when to conduct the second forage processing operation by way of a time module 346 to, for instance, a display device 336 or to any other computing machine, including any controller of work equipment 101-107 (such as controller 213).

Figure 4:
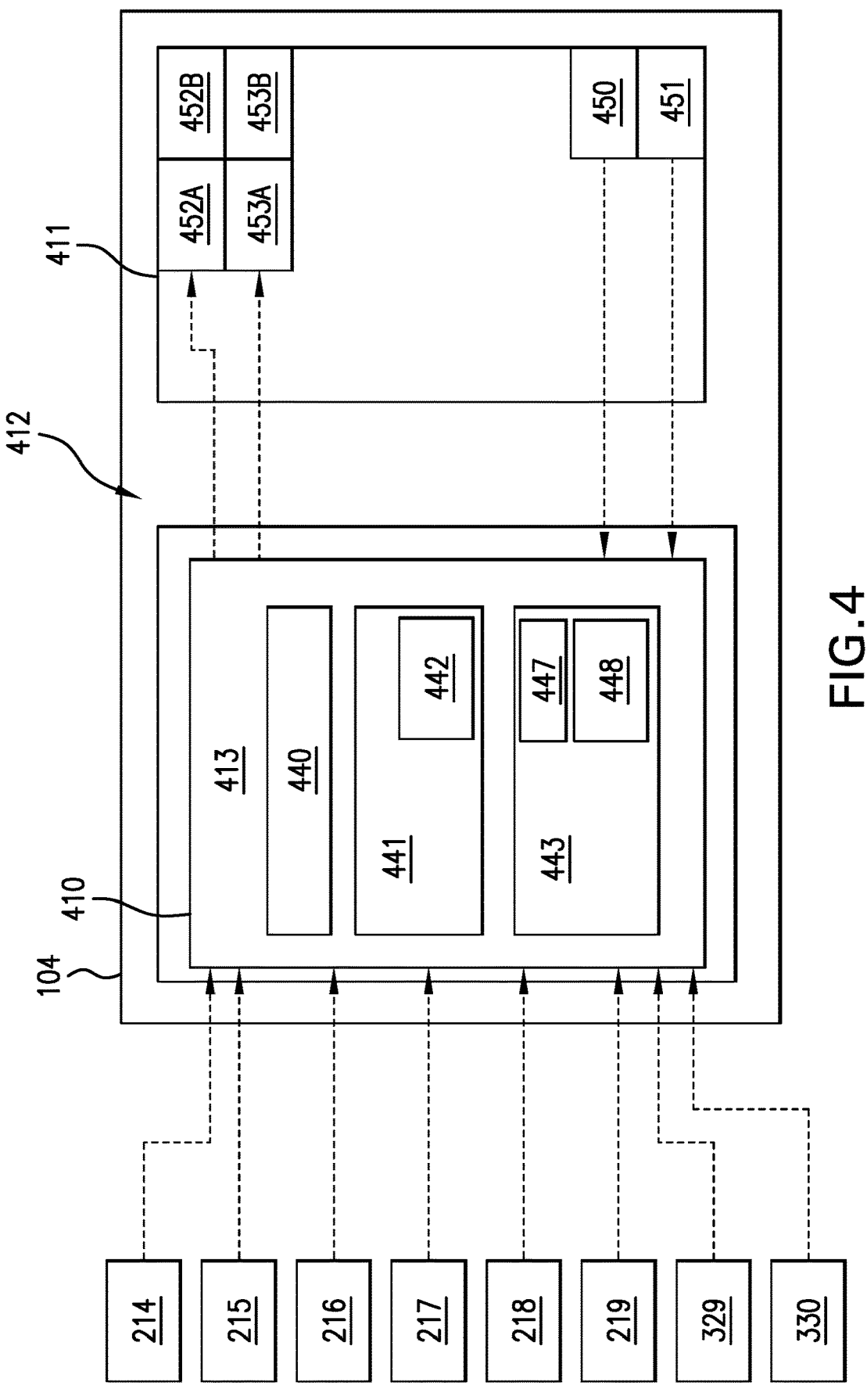
FIG. 4 illustrates a schematic view of another agricultural work equipment of the agricultural system of FIG. 1, in accordance with an exemplary embodiment of the present invention.

Referring now to FIG. 4, there is shown schematically another work equipment of the agricultural system 100 according to an embodiment of the present invention, more specifically, work equipment 104 for controllably harvesting forage. Work equipment 104 can include a tractor 410 and a baler (a forage processing assembly 411) coupled with tractor 410 (though different reference numerals are used herein for tractors of different work equipment, it can be readily appreciated that the same tractor can be used for some or all of the forage processing operations, together with the same controller of the tractor). Work equipment 104 can further include a control system 412 which is operatively coupled with control system 212 of work equipment 101 and can be configured for being operatively coupled with a control system of at least one intermediate agricultural work equipment. This intermediate agricultural work equipment can be a work equipment that performs a forage processing operation between the first forage processing operation (mowing-conditioning) and the forage processing operation (baling) performed by work equipment 104. Such an intermediate agricultural work equipment can be, for example, work equipment 102 for tedding, work equipment 103 for raking, and/or work equipment 107 for merging. The discussion that follows with respect to FIG. 4 assumes that the baling operation is the next forage processing operation after mowing-conditioning, though it need not be (for example, any intermediate work equipment could also measure yield or moisture while performing its forage processing operation, which could be used by a work equipment performing the next forage processing operation, such as baling). Control system of work equipment 104 can include sensors 450 and 451 of baler. Sensor 450 can detect a bale density (an actual condition of baler 411)(regardless of whether baler 411 is a round baler, a small square baler, or a large square baler) and can be positioned in any suitable location on baler 411, such as any existing bale density sensor location (for example, for a square baler, on or near a plunger to measure pressure applied to a bale, or for a round baler, on or near a belt or bar to measure tension). Sensor 451 can detect a speed of the power take-off (an actual condition of baler), such as a power take-off shaft, and can be positioned in any suitable location, such as any existing speed sensor location (for example, on tractor 410 or on a frame associated with baler 411, though FIG. 4 shows sensor 451 as a part of baler 411). Thus, sensors 450 and 451 are configured for sensing a respective actual condition of baler 411 and thereby for outputting an actual condition signal (an actual bale density signal, an actual PTO speed signal) associated with the actual bale density and the PTO speed. Control system 412 can further include actuators 452A and 453A, actuator 452A adjusting bale density, actuator 453 for adjusting the speed of PTO shaft. Actuator 452A can be any suitable actuator (such as any described above) and at any suitable location, and can be, for example, a linear actuator (such as a hydraulic cylinder) which can place more or less tension on a belt or roller of a round baler, or any suitable structure such as gearing with respect to a square baler (each of which can be designated as device 452B). Actuator 453A can be any suitable gearing (or way of changing gears), for example, at any suitable location (such as on tractor 410, though actuator 453A is shown as part of baler 411), or on or near baler 411, so as to adjust the speed of PTO shaft (device 453B).

Further, control system 412 includes a controller 413 operatively coupled with sensors 450 and 451, as well as baler 411. With respect to the baling operation and prior to beginning the actual baling operation, controller 413 is configured for (a) receiving the actual bale density signal and/or the actual PTO speed signal, (b) determining a baler adjustment signal based at least in part on at least one of the actual bale density signal, the actual PTO speed signal, and at least one predicted forage crop material condition associated with the baling operation, and (c) outputting, as a result of (a) and (b), the baler adjustment signal to actuators 452A, 453A and thereby for initially adjusting, prior to beginning the baling operation, device 452B and/or device 453B of the baler.

Regarding (b), similar to mower-conditioner 211 above, controller 413 can determine the baler adjustment signal based on the actual bale density signal provided by sensor 450 and on another predicted forage crop material condition associated with the baling operation, and/or can determine the baler adjustment signal based on the actual PTO speed signal provided by sensor 451 and on the predicted forage crop material condition. Like above, this predicted forage crop material condition can be an optimal date and time in which to conduct the baling operation. Such inputs for determining the predicted forage crop material condition include what has been described above, namely, weather data 214, agronomic data 215, field data 216, historical yield data 217, historical moisture data 218, the current forage processing operation (baling) 219, as well as the final actual forage crop material yield 329 and the final actual forage crop material moisture 330 obtained in conjunction with the mowing-conditioning operation (as described above), or such final yield and moisture values obtained in conjunction with an intermediate forage processing operation. Thus, for example, conducting the baling operation late as compared to the determined optimal date and time can suggest increasing the bale density (assuming a lower moisture content for a given plant), and increasing the PTO speed (with a presumed increase in quantity of forage crop material). Further, a high final actual forage crop yield can suggest raising the PTO speed, and a high final actual forage crop moisture can suggest decreasing the bale density and/or increasing the PTO speed (for example, to aid in pick-up of potentially heavier or slipperier forage crop material).

Further, controller 413 may correspond to any suitable processor-based device(s), such as a computing device or any combination of computing devices. Thus, as shown in FIG. 4, controller 413 may generally include one or more processor(s) 440 and associated memory 441 configured to perform a variety of computer-implemented functions (e.g., performing the methods, steps, algorithms, calculations and the like disclosed herein). For instance, controller 413 may include a respective processor 440 therein, as well as associated memory 441, data 442, and instructions 443, each forming at least part of controller 413. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 441 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 441 may generally be configured to store information accessible to the processor(s) 440, including data 442 that can be retrieved, manipulated, created, and/or stored by processor(s) 440 and instructions 443 that can be executed by the processor(s) 222. In some embodiments, data 442 may be stored in one or more databases.

Accordingly, controller 413 receives certain inputs and transmits certain outputs. For example, controller 413 receives input signals as discussed above. Controller 413 can output the respective baler adjustment signals to actuators 452A, 453A (associated respectively with devices 452B, 453B) of baler 411, based at least partly on the aforementioned inputs 214, 215, 216, 217, 218, 219, 329, 330 stored in memory 431, on the predicted forage crop material condition(s), and on one or more baler adjustment modules 447, 448 (447 being for adjusting bale density, 448 for adjusting baler PTO speed) formed in accordance with the algorithm and instructions 443 in controller 413, so as to adjust the associated actual condition to an associated target condition associated with the adjustment signal.

Referring now to FIG. 5, there is shown schematically another work equipment of the agricultural system 100 according to an embodiment of the present invention, more specifically, work equipment 106 for controllably harvesting forage. Work equipment 106 can include, for example, a tractor 510 and a chopper (a forage processing assembly 511) coupled with tractor 510; though the description of FIG. 5 primarily relates to a tractor with a pull-type chopper, it can be readily appreciated that a forage cruiser or forage harvester could be used instead to accomplish the chopping of the crop material, wherein a self-propelled vehicle includes a header with a pick-up unit for picking up a swath or windrow of crop material, and a chopper can be part of the header and/or part of a body of the self-propelled vehicle. Work equipment 104 can further include a control system 512 which is operatively coupled with control system 212 of work equipment 101 and can be configured for being operatively coupled with a control system of at least one intermediate agricultural work equipment. This intermediate agricultural work equipment can be a work equipment that performs a forage processing operation between the first forage processing operation (mowing-conditioning) and the forage processing operation (chopping) performed by work equipment 106. Such an intermediate agricultural work equipment can be, for example, work equipment 102 for tedding, work equipment 103 for raking, and/or work equipment 107 for merging. The discussion that follows with respect to FIG. 5 assumes that the chopping operation is the next forage processing operation after mowing-conditioning, though it need not be (for example, any intermediate work equipment could also measure yield or moisture while performing its forage processing operation, which could be used by a work equipment performing the next forage processing operation, such as chopping). Control system 512 of work equipment 106 can include sensor 554 of chopper 511. Sensor 554 can detect any suitable condition associated with effecting the length of cut of the forage crop material (an actual condition of chopper 511) processed by chopper 511, which can include a pick-up unit (for picking up the forage crop material off of the ground), a feeder unit (which can include feeder rolls), a chopping unit (which can include a rotating cutterhead), and a blower (for blowing the chopped forage crop material into a carrying device, such as a trailer). A specific length of cut can be effected by the speed of, for example, the rotating cutterhead (a faster rotation can be associated with a smaller particle size of the chopped forage crop material). Thus, sensor 554 can be a sensor that detects, for example, the speed of the PTO shaft running from the tractor to the chopper and providing the mechanical power to the various units of chopper (such as a feeder unit and a chopping unit), a sensor that detects rotation of a shaft driving the feeder rolls, and/or a sensor that detects rotation of a shaft driving the rotating cutterhead (these shafts are referenced singularly or collectively as device 555B). Thus, sensor 554 can be a single sensor or a plurality of sensors located at different suitable locations, such as on tractor 510 (though FIG. 5 shows sensor 554 as a part of chopper 511), or on a frame of chopper 511, or any location of an existing sensor performing any of these functions. Sensor 554 is configured for sensing a respective actual condition of chopper 511 and thereby for outputting an actual condition signal (for example, an actual shaft speed signal) associated with the actual speed, for example, of the PTO shaft, or other downstream shaft associated with the feeder unit and/or the cutterhead (referenced as shaft B), and/or any other structure associated with chopping the forage crop material. Control system 512 can further include an actuator 555A for adjusting the speed of shaft 555B. Actuator 555A can be any suitable structure, such as gearing (or other way of changing gears), for example, at any suitable location (such as on tractor 510, though actuator 555A is shown as part of chopper 511), or on or near chopper 511, so as to adjust the speed of shaft 555B. Further, as an alternative embodiment, if a forage cruiser or forage harvester were used, 510 would be the self-propelled agricultural vehicle, and 511 would be the chopper, and sensor 554, actuator 555A, and shaft 555B could still be employed in analogous ways that can be readily appreciated.

Further, control system B includes a controller 513 operatively coupled with sensor 554, as well as chopper 511. With respect to the chopping operation and prior to beginning the actual chopping operation, controller 513 is configured for (a) receiving the actual shaft speed signal, (b) determining a chopper adjustment signal based at least in part on the actual shaft speed signal and at least one predicted forage crop material condition associated with the chopping operation, and (c) outputting, as a result of (a) and (b), the chopper adjustment signal to actuator 555A and thereby for initially adjusting, prior to beginning the chopping operation, device 555B of the chopper 511.

Regarding (b), controller 513 can determine the chopper adjustment signal based on the actual shaft speed signal provided by sensor 554 and on another predicted forage crop material condition associated with the chopping operation. Like above, this predicted forage crop material condition can be an optimal date and time in which to conduct the chopping operation. Such inputs for determining the predicted forage crop material condition include what has been described above, namely, weather data 214, agronomic data 215, field data 216, historical yield data 217, historical moisture data 218, the current forage processing operation (chopping) 219, as well as the final actual forage crop material yield 329 and the final actual forage crop material moisture 330 obtained in conjunction with the mowing-conditioning operation (as described above), or such final yield and moisture values obtained in conjunction with an intermediate forage processing operation. Thus, for example, cutting late can suggest a higher taller forage crop material, which can suggest running the shaft speed relatively higher to obtain an average length of cut. Similarly, a final actual forage crop material yield that is high can suggest running the shaft speed relatively high so as to achieve an average length of cut. Further, a final actual forage crop material moisture that is high can suggest running the shaft speed relatively high so as to achieve a shorter length of cut, if further dry down is desired.

Further, controller 513 may correspond to any suitable processor-based device(s), such as a computing device or any combination of computing devices. Thus, as shown in FIG. 5, controller 513 may generally include one or more processor(s) 540 and associated memory 541 configured to perform a variety of computer-implemented functions (e.g., performing the methods, steps, algorithms, calculations and the like disclosed herein). For instance, controller 513 may include a respective processor 540 therein, as well as associated memory 541, data 542, and instructions 543, each forming at least part of controller 513. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 541 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 541 may generally be configured to store information accessible to the processor(s) 540, including data 542 that can be retrieved, manipulated, created, and/or stored by processor(s) 540 and instructions 543 that can be executed by the processor(s) 540. In some embodiments, data 542 may be stored in one or more databases.

Accordingly, controller 513 receives certain inputs and transmits certain outputs. For example, controller 513 receives input signals as discussed above. Controller 513 can output the respective chopper adjustment signals to actuator 555A (associated respectively with device 555B) of chopper 511, based at least partly on the aforementioned inputs 214, 215, 216, 217, 218, 219, 329, 330 stored in memory 541, on the predicted forage crop material condition(s), and on one or more chopper adjustment module 549 (549 being for adjusting speed of a shaft associated with chopping, such as shaft 555B) formed in accordance with the algorithm and instructions 543 in controller 513, so as to adjust the associated actual condition to an associated target condition associated with the adjustment signal.

Figure 6:
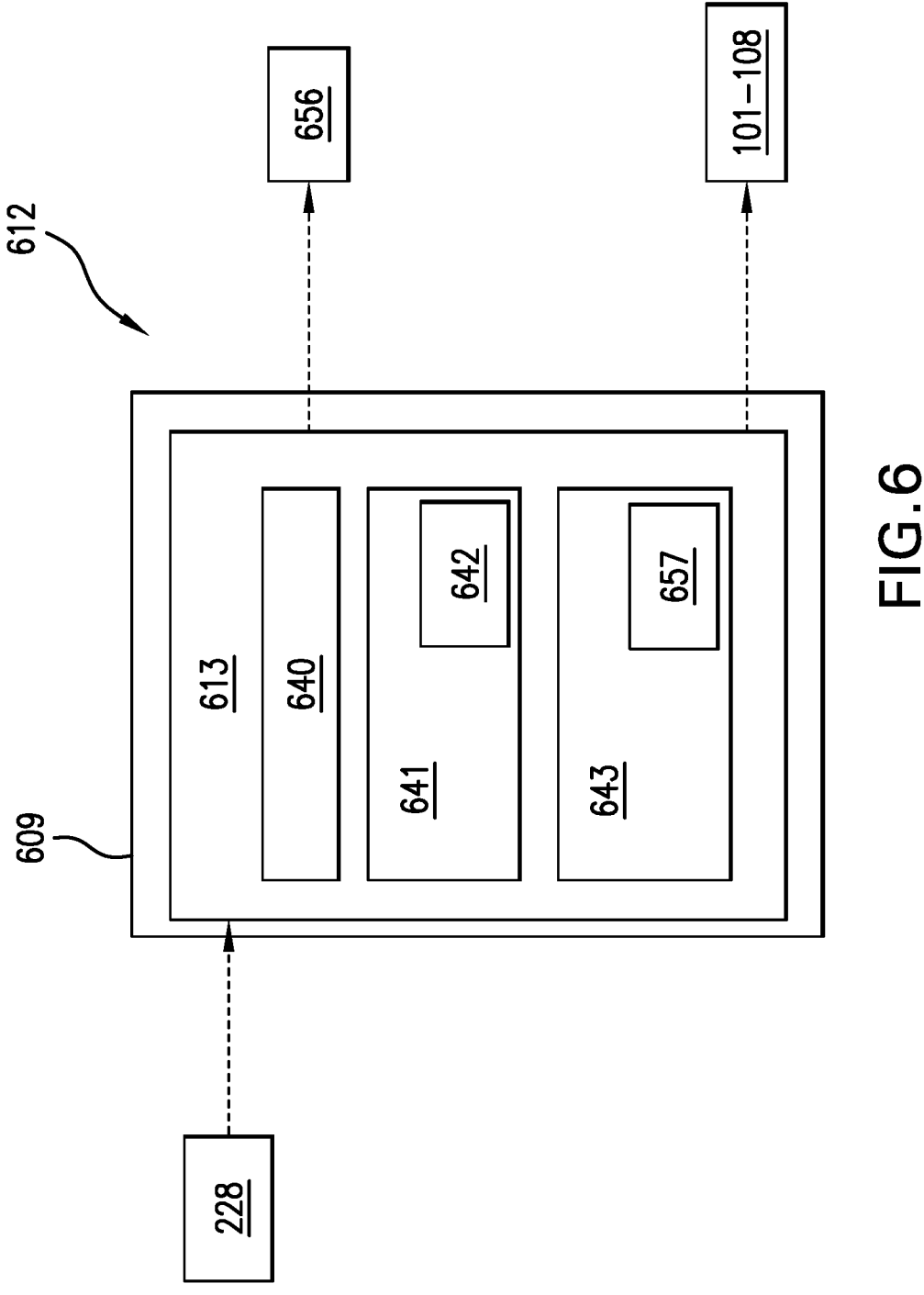
FIG. 6 illustrates a schematic view of another agricultural work equipment of the agricultural system of FIG. 1, in accordance with an exemplary embodiment of the present invention.

Referring now to FIG. 6, there is shown, according to another embodiment of agricultural system 100, any suitable agricultural work equipment 609 for controllably harvesting forage crop material and thus for conducting forage processing operations, work equipment 609 including a control system 612. Work equipment 609 can perform any of the forage processing operations referenced herein but performs a forage processing operation immediately prior to the forage processing operation referenced in conjunction with FIG. 7, below. Thus, this work equipment can be, for example, work equipment 101 for performing mowing-conditioning (which can be the first forage processing operation of a given season or cycle within a season) or, alternatively, an intermediate work equipment (which itself includes a control system with a controller) performing an intermediate forage processing operation, that is, a forage processing operation between mowing-conditioning and the forage processing operation referenced in conjunction with FIG. 7. Such intermediate forage processing operations can be, for example (and not by way of limitation), tedding, raking, merging, or baling. Control system 612 of work equipment 609 is operatively connected with any control system of any work equipment referenced herein (whether performing a previous, simultaneous, or future forage processing operation), so as to be able to communicate information amongst the various control systems used to perform the various forage processing operations (for instance, each control system can include a same, or substantially similar, forage processing software). Control system 612 thus includes an input device and a controller 613 (which can, as with all controllers referenced herein of work equipment including a tractor and an attachment, include a controller of the tractor and a controller of the attachment but is generally referenced and/or shown herein as controller of the tractor). As referenced above with respect to work equipment 101, this input device can be a GPS 228, positioned on agricultural work equipment 609 (which can be positioned within a cab or another suitable location of a self-propelled work equipment, within a cab or another suitable location of a tractor of a work equipment formed as a tractor plus an attachment attached to tractor, or on the attachment of this latter form of work equipment). As is well-known, the GPS 228 senses location coordinates for its location and can output this location information to controller 613. Controller 613 can store this GPS information and can develop essentially a map of the travels of work equipment 609 over a field while performing the forage processing operation. If the GPS 228 is offset from the actual location of the location of the swath or windrows of forage crop material, or the bales placed on the ground (for example, when the attachment is offset laterally relative to a fore-to-aft midline of, for example, a tractor pulling the attachment of work equipment 609), then controller 613 can perform a calculation taking into consideration such an offset so as to be able to determine the location of the respective swath/windrow or bale. The map of travels, thus, can include the location of rows of forage crop material (when the forage processing operation lays down on the ground a swath or windrow of forage crop material) or the location of bales of forage crop material (when the forage processing operation forms bales and leaves them behind on the ground). Further, controller 613 can output this location information to a display device 656 of work equipment 609, or to any other control system of any agricultural work equipment within agricultural system 100 (such as work equipment 101-107 and/or computing machine 108), including any agricultural work equipment performing a subsequent forage processing operation that may, for instance, be able to use this location information, such as work equipment 7. Controller 613 can output this location information as location signals.

Further, controller 613 may correspond to any suitable processor-based device(s), such as a computing device or any combination of computing devices. Thus, as shown in FIG. 6, controller 613 may generally include one or more processor(s) 640 and associated memory 223 configured to perform a variety of computer-implemented functions (e.g., performing the methods, steps, algorithms, calculations and the like disclosed herein). For instance, controller 613 may each include a respective processor 613 therein, as well as associated memory 641, data 652, and instructions 643, each forming at least part of respective controller 613. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 641 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 641 may generally be configured to store information accessible to the processor(s) 640, including data 642 that can be retrieved, manipulated, created, and/or stored by processor(s) 640 and instructions 643 that can be executed by the processor(s) 640. In some embodiments, data 642 may be stored in one or more databases.

Accordingly, controller 613 receives certain inputs and transmits certain outputs. For example, controller 613 receives input signals as discussed above with respect to GPS 228 (additional inputs can be included though not discussed, including any inputs referenced above, such as weather data 214, agronomic data 215, field data 216, historical yield data 217 (including previous, same-season yield data, as yield data 217 can be updated constantly), historical moisture data 217 (including previous, same-season moisture data, as moisture data 218 can be updated constantly), anticipated forage processing operation(s) 219, as well as final actual forage crop material yield and moisture 329, 330). Controller 613 can form a location module 657 based at least partly on an algorithm and data 642 stored in memory 641 such as location information from GPS 228, and can output a location signal(s) to display device 656 or to any agricultural work equipment (such as 101-107) and computing machine 108 within agricultural system 100 based on location module 657.

Figure 7:
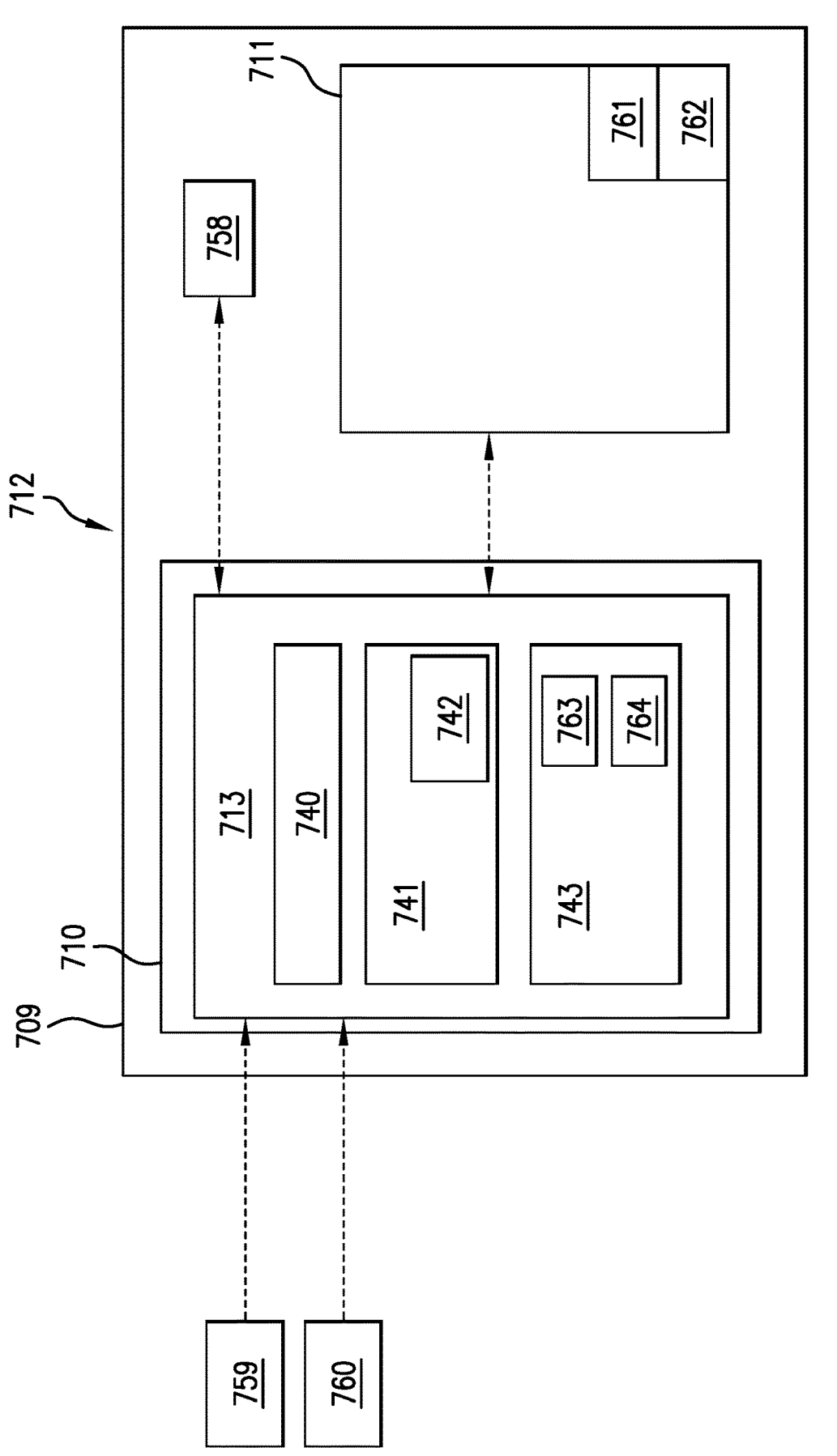
FIG. 7 illustrates a schematic view of another agricultural work equipment of the agricultural system of FIG. 1, in accordance with an exemplary embodiment of the present invention.

Referring now to FIG. 7, there is shown, according to another embodiment of agricultural system 100, an agricultural work equipment 709 for controllably harvesting the forage crop material. Agricultural work equipment 709 can perform the next (second) forage processing operation in a given season or cycle within a season, that is, typically a forage processing operation after mowing-conditioning. Such a forage processing operation can be, for example, tedding, raking, merging, chopping, baling, or bale retrieving. Alternatively, agricultural work equipment can perform the next (third) forage processing operation in the season (or cycle), or any other follow-on forage processing operation (for example, the fourth, fifth, sixth, and so on, forage processing operation), which can be any of the aforementioned forage processing operations (for example, tedding, raking, merging, chopping, baling, or bale retrieving). If work equipment 709 is performing the third or subsequent forage processing operation, then work equipment 709 is following an intermediate forage processing operation performed by an intermediate agricultural work equipment including a control system with a controller. Relating FIGS. 6 and 7, it is presumed herein, for the sake of discussion, that agricultural the agricultural work equipment 709 in FIG. 7 performs at least one forage processing operation following immediately after the forage processing operation performed by agricultural work equipment 609.

Agricultural work equipment 709 includes a forage processing assembly 711 (for example, a tedder, a rake, a merger, a chopper, a baler, or a bale retriever), a steering mechanism 758, and a control system D. Agricultural work equipment D, according to this embodiment of the present invention, is configured for performing autonomous forage processing operations. Agricultural work equipment 709 can be self-propelled (so as to include forage processing assembly 711 as a part of a prime mover) or include a tractor 710 plus forage processing assembly 711 attached to tractor 710;

the latter is assumed to be the case for the sake of discussion. The steering mechanism 758 of a tractor 710 is well-known and thus will not be discussed in detail, but generally serves to steer the tractor 710. The steering mechanism 758 is operatively coupled with control system 712 by, for example, any suitable sensors and actuators known in the art for automatically controlling a steering mechanism 758 of an automotive vehicle. Control system 712 is operatively coupled with, for example, control system 212 of agricultural work equipment 101 (mower-conditioner 101) and is configured for being operatively coupled with a control system 612 of at least one intermediate agricultural work equipment 609 (as indicated in FIG. 1). Control system 712 includes a controller 713 operatively coupled with forage processing assembly 711 and steering mechanism 758 (controller 713 can, as with all controllers referenced herein of an agricultural work equipment including a tractor and an attachment, include a controller of the tractor and a controller of the attachment but is generally referenced and/or shown herein as controller of the tractor). Controller 713 is configured for (a) determining a path signal based at least in part on (i) an actual row position 759 (outputted by controller 613) of at least one row of a cut forage crop material of an immediately preceding forage processing operation (as referenced with respect to FIG. 6), or (ii) an actual bale position 760 (outputted by controller 613) of at least one bale of forage crop material of the immediately preceding forage processing operation (as referenced with respect to FIG. 6), and (b) outputting the path signal and thereby adjusting the steering mechanism 758 to correspond with the actual row position 759 or the actual bale position 760 so as to conduct the forage processing operation with forage processing assembly 709. Regarding (a), the path signal corresponds to the path that work equipment 709 is to take across a given field of forage crop material in order to perform the next forage processing operation. Further, this path signal can be generated by an algorithm within controller 713 and is based on information provided by controller 613 of work equipment 609 and further depends upon the forage processing operation to be performed by work equipment 709. That is, controller 713 receives the location signals outputted by controller 613. These location signals can correspond to the location of rows of forage crop material (when the immediately preceding forage processing operation—that is, the forage processing operation immediately preceding the forage processing operation to be performed by work equipment 713—lays down on the ground a swath or windrow of forage crop material) or the location of bales of forage crop material (when the immediately preceding forage processing operation forms bales and leaves them behind on the ground); with respect to the former, the immediately preceding forage processing operation can be, for example, mowing-conditioning, tedding, raking, or merging, and with respect to the latter the immediately preceding forage processing operation can be baling (such that the forage processing operation to be performed by work equipment 709 is bale retrieving). Regarding (a)(i), a row is a swath or windrow of forage crop material, and the actual row position 759 corresponds to the location signals from controller 613 pertaining to the location of rows of forage crop material. Regarding (a)(ii), the actual bale position 760 corresponds to the location signals from controller 613 pertaining to the location of bales of forage crop material.

Further, when agricultural work equipment 709 performs a baling operation such that forage processing assembly 711 is a baler (in this case, agricultural work equipment 709 is agricultural work equipment 104), or, alternatively, work equipment 709 performs a bale retrieving operation such that forage processing assembly 711 is a bale retriever (in this case, agricultural work equipment 709 is agricultural work equipment 105), forage processing assembly 709 can include a sensor 761 for sensing a respective bale weight and a sensor 762 for sensing a respective bale moisture. Sensors 761 and 762 can be located at any suitable location of the respective forage processing assembly 711, such as at any existing location of any existing such sensors; such locations can include a frame, rod, bar, or belt of the baler 711 or bale retriever 711. Further, controller 713 is configured for receiving a signal from sensor 761 associated with a respective bale weight, and/or a signal from sensor 762 associated with a respective bale moisture. The information associated with these signals can be stored in controller 713 and used, for example, for any future forage processing operation, whether of the same year or any subsequent years. Further, as is known, controller 713 can perform additional functions Further, controller 713 may correspond to any suitable processor-based device(s), such as a computing device or any combination of computing devices. Thus, as shown in FIG. 7, controller 713 may generally include one or more processor(s) 740 and associated memory 741 configured to perform a variety of computer-implemented functions (e.g., performing the methods, steps, algorithms, calculations and the like disclosed herein). For instance, controller 713 may each include a respective processor 740 therein, as well as associated memory 741, data 742, and instructions 743, each forming at least part of controller 713. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 741 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 741 may generally be configured to store information accessible to the processor(s) 740, including data 742 that can be retrieved, manipulated, created, and/or stored by processor(s) 740 and instructions 743 that can be executed by the processor(s) 222. In some embodiments, data 742 may be stored in one or more databases.

Accordingly, controller 713 receives certain inputs and transmits certain outputs. For example, controller 713 receives input signals 759, 760 as discussed above from controller 613 (additional inputs can be received though not discussed, including any inputs referenced above, such as weather data 214, agronomic data 215, field data 216, historical yield data 217 (including previous, same-season yield data, as yield data 218 can be updated constantly), historical moisture data 218 (including previous, same-season moisture data, as moisture data 218 can be updated constantly), anticipated forage processing operation(s) 219, previous (same season) yield data, and/or previous same season) moisture data). Controller 713 can form a row location module 763 and bale location module 764 based at least partly on an algorithm and data 742 stored in memory 741 such as row and bale location information, and can output a location signal(s) to steering mechanism (758) based on modules 763, 764. Further, because autonomous vehicular operations are known, they are not discussed in detail here. However, at the command of a user (who may or may not be riding in a cab of, for instance, a tractor 710 of work equipment 709), or as previously programmed, controller 713 can start an engine of work equipment 709 to begin performing a forage processing operation and can turn off the engine when the forage processing operation is completed, and can control all operations of work equipment 709 therebetween. For instance, controller 713 is configured for controlling the speed of work equipment 713, the braking of work equipment 713, and the functions of forage processing assembly 711, such as engaging and disengaging forage processing assembly 711, turning it on or off, raising and lowering it, and any other functions.

Figure 8:
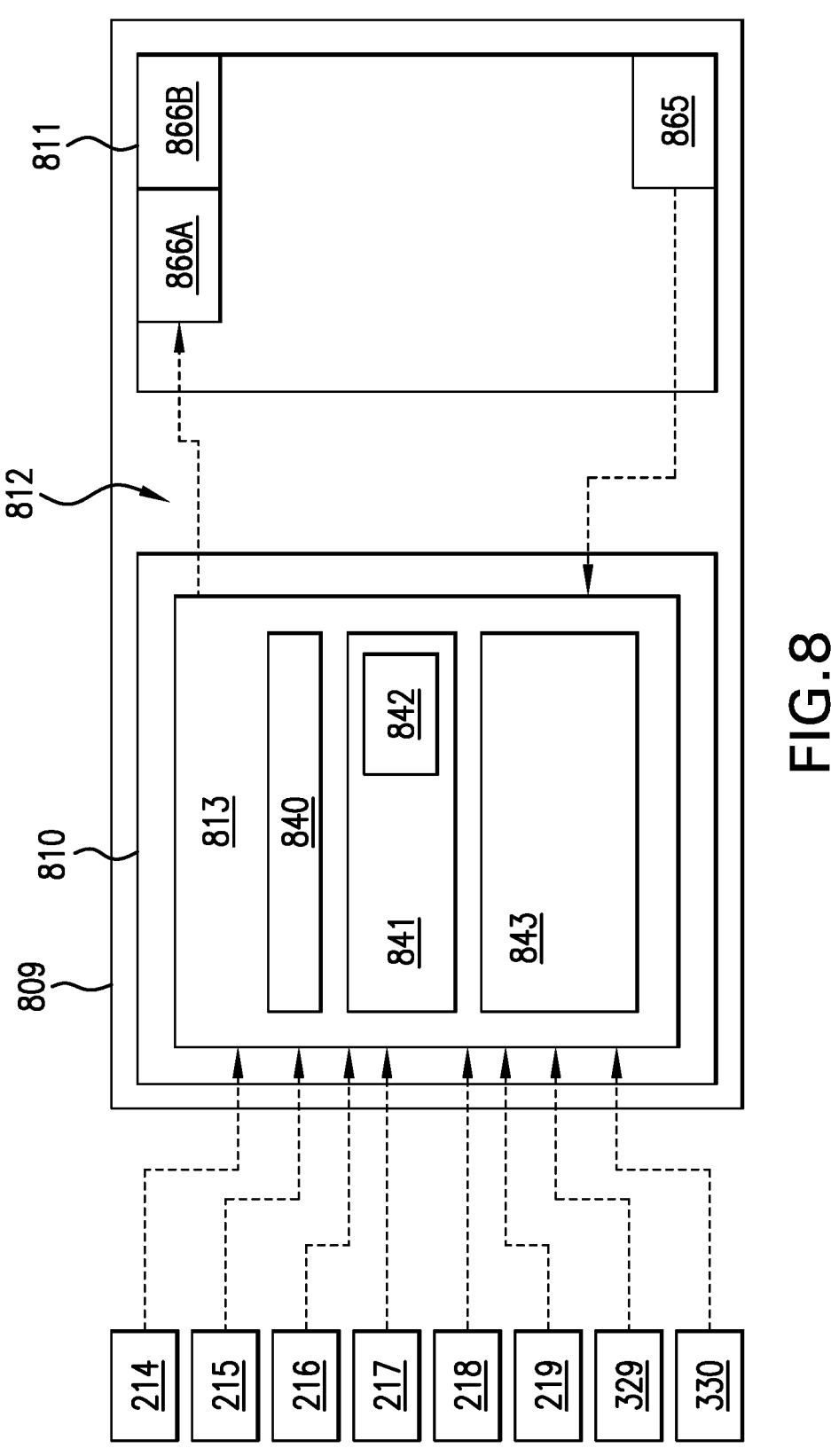
FIG. 8 illustrates a schematic view of another agricultural work equipment of the agricultural system of FIG. 1, in accordance with an exemplary embodiment of the present invention.

Referring now to FIG. 8, there is shown, according to another embodiment of agricultural system 100, an agricultural work equipment 809 for controllably harvesting the forage crop material and thus for conducting forage processing operations. Work equipment 809 can be, for example, any work equipment configured for performing any of the forage processing operations referenced herein, subsequent to mowing-conditioning. Work equipment 809 includes a forage processing assembly 811 (which can also be called a forage processing assembly, as indicated above) and a control system 812 operatively coupled with control system 212, and any or all of the other control systems referenced herein (and any other control system associated with performing any of the forage processing operations referenced herein). Forage processing assembly 811 can be any device configured for performing any of the forage processing operations subsequent to mowing-conditioning and can be an attachment attached to a tractor or be a part that is typically permanently affixed to a self-propelled agricultural vehicle. Here, work equipment 809 is in the embodiment of a tractor 810 with forage processing assembly 811 attached thereto. Control system 812 includes at least one sensor 865 and controller 813. Sensor 865 is configured for sensing any operative parameter of forage processing assembly 811 and for outputting this data to controller 813, which can evaluate this data as an input. Controller 813 is operatively coupled with controller 213 (and any or all of the other control systems referenced herein and any other controller associated with performing any of the forage processing operations referenced herein) and forage processing assembly 811; controller 813 can, as with all controllers referenced herein of an agricultural work equipment including a tractor (or any self-propelled agricultural vehicle) and an attachment, include a controller of the tractor and a controller of the attachment but is generally referenced and/or shown herein as controller of the tractor.

Controller 813 is configured for (a) determining an adjustment signal based at least in part on at least one of the at least one first predicted forage crop material condition of the first forage processing operation (as in the discussion above with respect to FIG. 2), the actual forage crop material yield signal of the first forage processing operation (as in the discussion above with respect to FIG. 2), the actual forage crop material moisture signal of the first forage processing operation (as in the discussion above with respect to FIG. 2), the final actual forage crop material yield of the first forage processing operation (as in the discussion above with respect to FIG. 3), and the final actual forage crop material moisture of the first forage processing operation (as in the discussion above with respect to FIG. 3), and (b) outputting, as a result of (a), the other adjustment signal to at least one actuator 866A and thereby for adjusting another device 866B of forage processing assembly 811. Because forage processing assembly 811 can be suitable for any of the forage processing operations referenced above subsequent to mowing-conditioning (including tedding, raking, merging, chopping, baling, and bale retrieval), sensor 865, actuator 866A, and device 866B can each be a part of or otherwise associated with (such as being mounted to or forming a part of an associated agricultural vehicle to which forage processing assembly 811 is attached) forage processing assembly 811. Sensor 865, actuator 866A, and device 866B can be formed as any of the sensors, actuators, and devices previously referenced herein or any other suitable such sensor, actuator, device associated with any of the referenced forage processing operations. By way of example and not limitation, if forage processing assembly 811 is a tedder, device 866B can be tines or group of tines, sensor 865 can sense a position or speed of the tines, and actuator 866A can be any device suitable for adjusting the position or speed of the tines. Further, by way of example and not limitation, if forage processing assembly 811 is a rake, device 866B can be wheels performing the raking or group of such wheels, sensor 865 can sense a position or speed of the wheels, and actuator 866A can be any device suitable for adjusting the position or speed of the wheels. Further, by way of example and not limitation, if forage processing assembly 811 is a merger, device 866B can be pick-up wheels, a belt, or a shield, sensor 865 can sense a position or speed of any of the pick-up wheels, belt, or shield, and actuator 866A can be any device suitable for adjusting the position or speed of the pick-up wheels, belt, or shield. Further, by way of example and not limitation, if forage processing assembly 811 is a chopper, device 866 can be a feeder unit or a chopper unit, sensor 865 can sense a position or speed of the feeder unit or chopper unit, and actuator 866B can be any device suitable for adjusting the position or speed of the feeder unit or chopper unit. Further, by way of example and not limitation, if forage processing assembly 811 is a baler, device 866B can be a pick-up unit, a plunger, a belt, or a bar, sensor 865 can sense a position or speed of any of these structures, and actuator 866A can be any device suitable for adjusting the position or speed of any of these structures. Further, by way of example and not limitation, if forage processing assembly 811 is a bale retriever, device 866B can be a pick-up unit, feeder unit, or a stacking unit, sensor 865 can sense a position or speed of any of these structures, and actuator 866A can be any device suitable for adjusting the position or speed of any of these structures. Controller 813 can consider as additional inputs what has been referenced above, namely, weather data 214, agronomic data 214, field data 216, historic or current yield data 217, historic or current moisture data 218, anticipated forage processing operations 219, final yield data 329, and final moisture data 330. Further, it can be appreciated controller 813 can not only evaluate and consider as inputs the factors mentioned in (b) above but any other factor as well, such as any information gleaned from any prior forage processing operation; in this way, the information that controller 813 can consider is cumulative.

Further, controller 813 may correspond to any suitable processor-based device(s), such as a computing device or any combination of computing devices. Thus, as shown in FIG. 8, controller 813 may generally include one or more processor(s) 840 and associated memory 841 configured to perform a variety of computer-implemented functions (e.g., performing the methods, steps, algorithms, calculations and the like disclosed herein). For instance, controller 813 may include a respective processor 840 therein, as well as associated memory 841, data 842, and instructions 843, each forming at least part of controller 513. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, memory 841 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 541 may generally be configured to store information accessible to the processor(s) 840, including data 842 that can be retrieved, manipulated, created, and/or stored by processor(s) 840 and instructions 843 that can be executed by the processor(s) 840. In some embodiments, data 842 may be stored in one or more databases.

Figure 10:
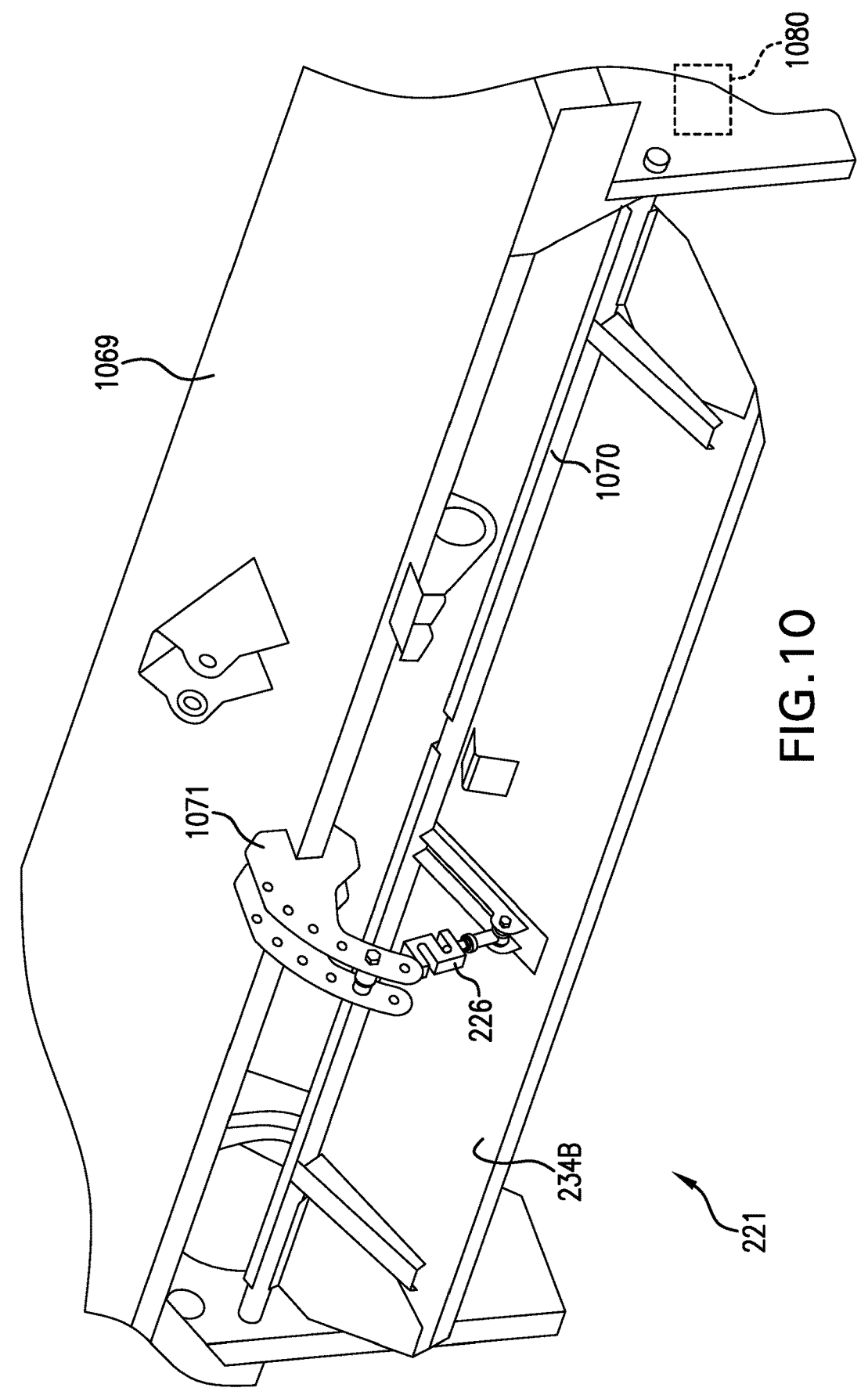
FIG. 10 illustrates a perspective view of another embodiment of the swath gate of the mower-conditioner machine of FIG. 2, with portions broken away, the swath gate having a force/load sensor attached thereto, in accordance with an exemplary embodiment of the present invention.

Referring now to FIG. 10, there is shown mower-conditioner machine 211, with portions broken away, from the rear. More specifically, shown are frame 1069, a pivot tube 1070 pivotably mounted to frame 1069, swath gate 234B, mounting bracket 1071 including a plurality of mounting holes, and sensor 226. Sensor 226 is formed here as a load cell device 226 integrated as a mounting strut spanning the distance between a topside surface of swath gate 234B and mounting bracket 1071. The connection between sensor 226 and swath gate 234B is pivotable, as is the connection between sensor 226 and mounting bracket 1071. The latter connection can be manually adjusted by selectively repositioning the connection in a respective pair of mounting holes in mounting bracket 1071, depending upon the trajectory that the user wishes the crop material to take when exiting, for example, conditioning rollers of swath gate 234B. Though only one sensor 226 is shown in FIG. 10, it can be appreciated that a plurality of sensors 226 can be employed at various positions along the topside surface of swath gate 234B.

Figure 11:
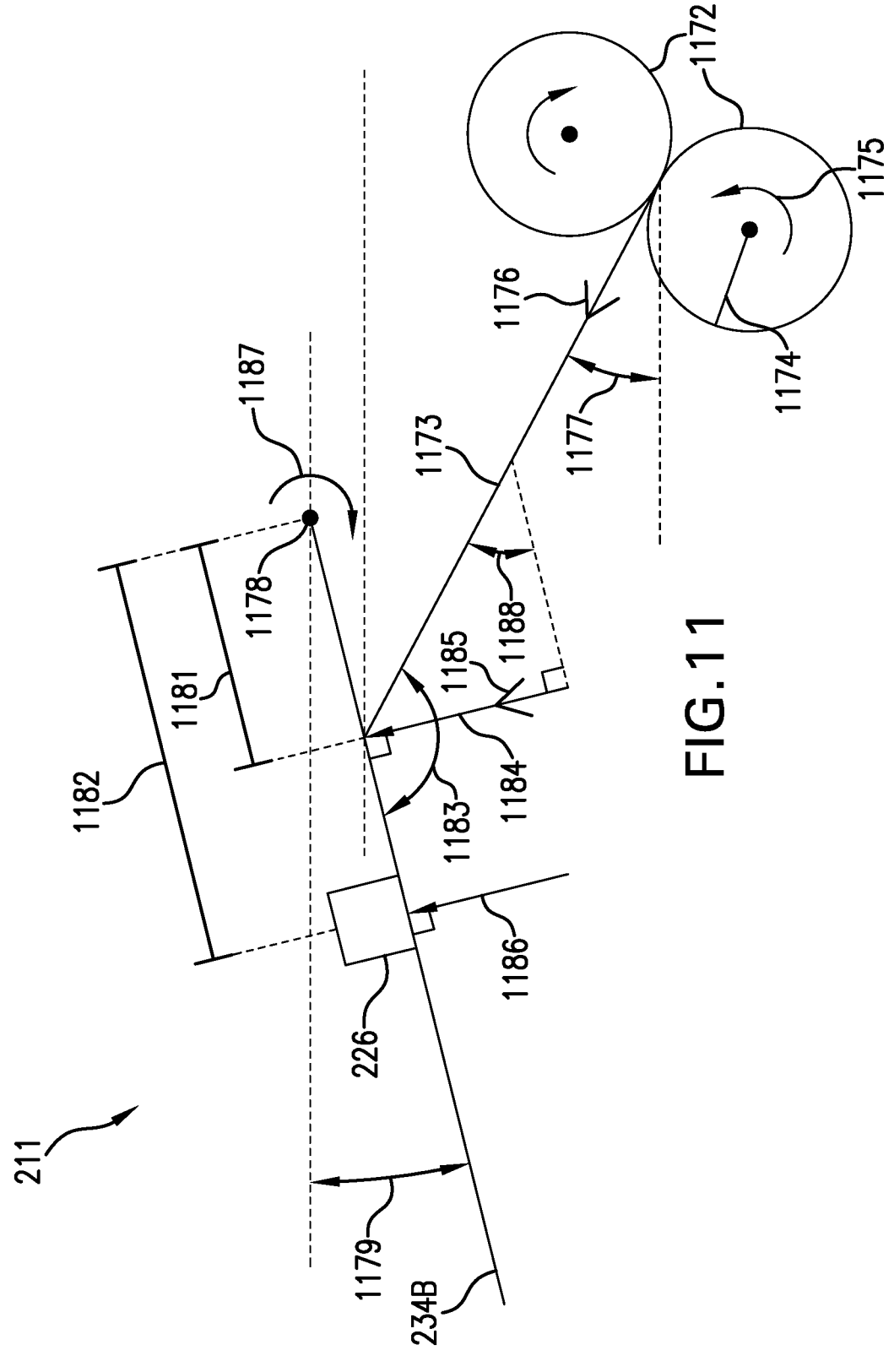
FIG. 11 illustrates a schematic, side view of the swath gate and conditioner rolls of the mower-conditioner machine of FIG. 10, with portions broken away.

Referring now to FIG. 11, there is shown a side view of swath gate 234B, conditioning rolls 1172 (which includes upper roll 232B, though not labeled; alternatively, a single roll with flails could be provided instead), yield sensor 226 (shown schematically), and a stream 1173 of crop material (which can also be referred to as a crop mat at this stage) exiting from between conditioning rolls 1172 and striking against the underside surface of swath gate 234B (not shown is the crop material falling away after striking swath gate 234B). In conjunction with FIG. 11, what is described is how to calculate the mass of the crop material striking swath gate 234B, and thus the crop yield (that is, prior to any subtraction of moisture content). Further, what is shown in FIG. 11 can be considered a single frame of reference moving horizontally to the right of the page and at the same speed. Conditioning rolls 1172 rotate in opposite directions and with substantially similar angular velocity, the lower conditioning roll shown to have a radius 1174 and to rotate counter-clockwise with an angular velocity 1175. The stream 1173 of crop material exits from between conditioning rolls 1172 at a velocity 1176 of the crop (signified by the arrow 1176 on stream 1173) and at an angle 1177 with the horizontal (which can be deemed to be the ground) or a horizontal surface of mower-conditioner 211. Velocity 1176 and angle 1177 can be deemed constant, with velocity being calculated from angular velocity 1175 and radius 1174 (linear velocity=radius*angular velocity). Swath gate 234B rotates about a pivot axis 1178 in order to set the angular setting of swath gate 234B by way of pivot tube 1070 and mounting bracket 1071. With the angular setting of swath gate 234B in FIG. 11, swath gate 234B is at an angle 1179 from the horizontal (which can be sensed by the position sensor 1080), and stream 1173 of crop material strikes swath gate 234B at a radial distance 1181 from pivot axis 1178; (radial distance 1181 can be calculated from angles 1177 and 1179). Yield sensor 226 is positioned a radial distance 1182 from pivot axis 1178. Assumed is that stream 1173 strikes swath gate 234B at velocity 1176 and at angle 1177 to the horizontal and that swath gate 234B is essentially a rigid surface that does not deflect and can be used to measure load imparted by the crop material. Further, angle 1183 can be calculated using angles 1177 and 1179.

In general, the equation "force=mass*acceleration" can be used to determine the mass of the forage crop material and thus the yield. More specifically, this can be adapted so as to use the impact force of the crop material on swath gate 234B over a period of time to calculate the mass of the crop material, as follows: $f_{ave}=(m*v)/t$, wherein $m=(f_{ave}*t)/v$, wherein $f_{ave}$ is the average crop force, m=mass of crop material, v=velocity of crop material, and t=elapsed time. According to one way of working with this latter equation, $f_{ave}$ can more specifically correspond to a perpendicular force 1184 ($f_{ave-p-st}$) of stream 1173, and v can more specifically correspond to a vertical velocity component $w_{eft}$ 1185 of velocity 1176. Perpendicular force 1184 can be calculated using the perpendicular force 1186 measured by sensor 226 and a force balancing about pivot axis 1178 (in particular, pivot tube 1070). That is, the moment 1187 (torque) about axis 1178 caused by stream 1173 striking swath gate 234B is equal to both the moment about axis 1178 caused by force 1184 and the moment about axis 1178 caused by force 1186 (moment=force*distance), wherein force 1184=(force 1186*distance 1182)/(distance 1181). Further, $v_{vert}$ 1185=velocity 1176*sine (angle 1188), wherein angle 1188 can be calculated given angles 1177, 1179, 1183.

Further, a correction factor can be employed as well, to render the mass calculation even more precise. In this vein, then the equation for mass can become: $m=c*(f_{ave}*t)/v$, wherein c is a crop constant based on the physical characteristics of the mowed crop material. This, optionally, can include (though not necessarily so) the moisture content of the crop material that is measured by moisture sensor 227 (that is, the dry matter content of the yield can be calculated knowing the moisture content). Further, the mass of the crop material over a period of time (for example, at a frequency of 1 Hz) along with GPS location (i.e., from sensor 228 and/or a substantially similar location sensor on the agricultural vehicle, such as tractor 210) to provide the yield map. Further, a correction factor for machine set up (i.e., mower-conditioner machine 211) can be used as well, which can reflect roll pressure and/or roll gap (with reference to conditioning rolls 1172); for, the crop material may contact the swath gate 234B differently for different roll pressures, for example. Controller 213, for instance, can be used to make all of these calculations to determine mass and thus crop yield.

In use, agricultural system 100 can include any of work equipment 101-107 and computing machine 108. For instance, work equipment 101 can begin a cycle of harvesting the forage crop material, thus beginning with mowing-conditioning. Before starting the actual mowing-conditioning, the mower-conditioner 211 can be set up by way of setting some initial settings of mower-conditioner 211, to include setting a proper rotary disc speed, a roller gap, a roller pressure, a swath gate position, and/or a windrow shield position. This can be accomplished by controller 213, receiving inputs of weather data 214, agronomic data 215, field data 216, historic yield data 217, historic moisture data 218, anticipated forage processing operation(s), and making outputs so as to adjust devices 231B-231B by way of actuators 231A-231A. Further, during mowing-conditioning, a proper rotary disc speed, a roller gap, a roller pressure, a swath gate position, and/or a windrow shield position can be further adjusted based on 214-218, in particular, current yield data 217 and current moisture data 218 from yield and moisture sensors 226, 227 on mower-conditioner 211. Further, agricultural system 100 can further provide that computing machine 108, or any of the controllers of agricultural work equipment 101-107, can determine when to conduct a first forage processing operation of a first cycle of a given season, a second forage processing operation of the same cycle, any subsequent forage processing operation of the same cycle, and/or a first forage processing operation of a second or subsequent cycle of the season, as well as any subsequent forage processing operations. To make this determination, computing machine 108 considers inputs 214-219, as well as final forage yield and final forage moisture data 329, 330 of a previous forage processing operation. Computing machine 108 can display this information to a user on a display device 336. Further, agricultural system 100 can further provide that work equipment 104 with baler 411 can adjust the bale density and/or the PTO speed using any of the aforementioned data inputs, including 214-219, 329, 330. Further, agricultural system 100 can further provide that work equipment 106 with chopper 511 can adjust the length of cut using any of the aforementioned data inputs, including 214-219, 329, 330. Further, agricultural system 100 can further provide that the agricultural work equipment operates autonomously, such as any agricultural work equipment (102-107) following a prior forage processing operation which laid down swaths or windrows, or bales. When this agricultural work equipment is for baling the forage crop material (104) or retrieving bales of forage crop material (105), the controller 713 of work equipment 104 can receive signals associated with bale weight and/or bale moisture of the respective bales. Finally, any agricultural work equipment performing any given one of the forage processing operations in any given cycle of any given season can use any of the information that has been acquired before the current forage processing operation, as the information is cumulative; in this way, each current forage processing operation can further fine tune any adjustments on the agricultural work equipment. Further, it can be appreciated that if any attachment (such as any of the forage processing assemblies referenced herein) does not include its own controller, then the controller of the tractor (or any other self-propelled agricultural vehicle) can perform the functionality of that described herein with respect to the controller of the attachment.

Figure 12:
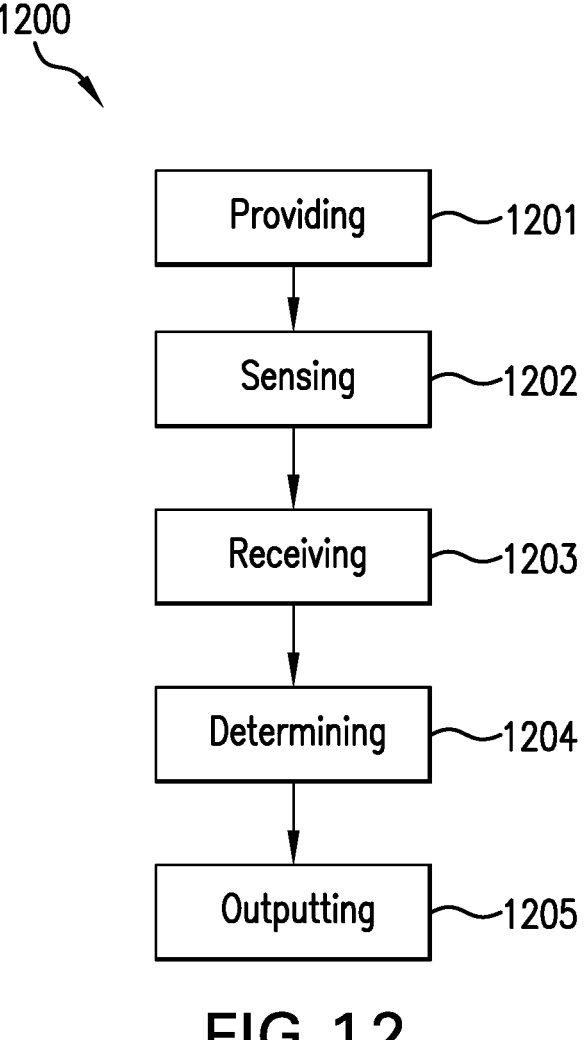
FIG. 12 illustrates a flow diagram showing a method for controllably harvesting a forage crop material by an agricultural system, in accordance with an exemplary embodiment of the present invention.

Referring now to FIG. 12, there is shown a flow diagram of a method 1200 for controllably harvesting a forage crop material by an agricultural system. Method 1200 includes the steps of: providing 1201 the agricultural system 100 which includes a first agricultural work equipment 101 for controllably harvesting the forage crop material, the first agricultural work equipment 101 including a first forage processing assembly 211 and a first control system 212 including a first forage processing assembly condition sensor 221-225 and a first controller 213 operatively coupled with the first forage processing assembly condition sensor 221-225 and the first forage processing assembly 211; sensing 1202, by the first forage processing assembly condition sensor 221-225, a first actual condition of the first forage processing assembly 211 and thereby outputting a first actual condition signal associated with the first actual condition of the first forage processing assembly 211; receiving 1203, by the first controller 213, the first actual condition signal; determining 1204, by the first controller 213, a first adjustment signal based at least in part on the first actual condition signal and at least one first predicted forage crop material condition associated with a first forage processing operation; and outputting 1205, by the first controller 213, the first adjustment signal and thereby for initially adjusting, prior to beginning the first forage processing operation, a first device 231B-235B of the first forage processing assembly. Method 1200 can further provide that the first control system 212 of the first agricultural work equipment 101 further includes at least one of (a) a first forage processing assembly forage crop material yield sensor 226 configured for sensing an actual forage crop material yield during the first forage processing operation and for outputting an actual forage crop material yield signal associated with the actual forage crop material yield, and (b) a first forage processing assembly forage crop material moisture sensor 227 configured for sensing an actual forage crop material moisture during the first forage processing operation and for outputting an actual forage crop material moisture signal associated with the actual forage crop material moisture, wherein the first controller 213 is operatively coupled with at least one of the first forage processing assembly forage crop material yield sensor 227 and the first forage processing assembly forage crop material moisture sensor 228, wherein the first controller 213 is configured for: receiving at least one of the actual forage crop material yield signal and the actual forage crop material moisture signal; determining a second adjustment signal based at least in part on at least one of the actual forage crop material yield signal and the actual forage crop material moisture signal; outputting the second adjustment signal and thereby for further adjusting, after beginning the first forage processing operation, the first device 231B-235B of the forage processing assembly. Method 1200 can further provide that the first forage processing assembly 211 includes a mower-conditioner 211, and the first device 231B-235B is associated with one of a rotary disc, an upper roller, a tension member, a swath gate, and a windrow shield. Method 1200 can further provide that agricultural system can further include a computing machine 108 including a controller 313 operatively coupled with the first controller 213 of the first agricultural work equipment 211, wherein the controller 313 of the computing machine 108 is configured for determining when to conduct a second forage processing operation based at least in part on at least one of a final actual forage crop material yield 329 of the first forage processing operation and a final actual forage crop material moisture 330 of first forage processing operation, wherein the first forage processing operation includes mowing and conditioning, and the second forage processing operation is subsequent to the first forage processing operation and is one of tedding, raking, merging, baling, and chopping. Method 1200 can further provide that agricultural system 100 further includes a second agricultural work equipment 104, 106 for controllably harvesting the forage crop material, the second agricultural work 104, 106 equipment including: a second forage processing assembly 411, 511; a second control system 412, 512 operatively coupled with the first control system 212 and configured for being operatively coupled with a control system of at least one intermediate agricultural work equipment 102, 103, 105, 107, the second control system 412, 512 including: a second forage processing assembly condition sensor 450, 451, 554 configured for sensing a second actual condition of the forage processing assembly 411, 511 and thereby for outputting a second actual condition signal associated with the second actual condition of the forage processing assembly 411, 511; a second controller 413, 513 operatively coupled with the second forage processing assembly condition sensor 450, 451, 554 and the second forage processing assembly 411, 511 and configured for: receiving the second actual condition signal; determining a third adjustment signal based at least in part on the second actual condition signal and at least one second predicted forage crop material condition associated with a second forage processing operation; outputting the third adjustment signal and thereby for initially adjusting, prior to beginning the second forage processing operation, a second device 452B, 453B, 555B of the second forage processing assembly 411, 511. Method 1200 can further provide that agricultural system 100 further includes a second agricultural work equipment 709 for controllably harvesting the forage crop material, the second agricultural work equipment 709 including: a second forage processing assembly 711; a steering mechanism 758; a second control system 712 operatively coupled with the first control system 212 and configured for being operatively coupled with a control system 612 of at least one intermediate agricultural work equipment 609, the second control system 712 including: a second controller 713 operatively coupled with the second forage processing assembly 711 and the steering mechanism 758, the second controller 713 configured for: determining a path signal based at least in part on one of an actual row position 759 of at least one row of a cut forage crop material of an immediately preceding forage processing operation and an actual bale position 760 of at least one bale of forage crop material of the immediately preceding forage processing operation; outputting the path signal and thereby adjusting the steering mechanism 758 to correspond with one of the actual row position and the actual bale position so as to conduct a second forage processing operation with the second forage processing assembly, wherein, when the second forage processing operation is one of a baling operation and a bale retrieval operation, the second controller 713 is configured for receiving at least one of a signal associated with a respective bale weight and a signal associated with a respective bale moisture.

It is to be understood that the steps of method 1200 are performed by controller 213, 313, 413, 513, 613, 713, 813 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 213, 313, 413, 513, 613, 713, 813 described herein, such as the method 1200, is implemented in software code or instructions which are tangibly stored on a tangible computer readable medium. The controller 213, 313, 413, 513, 613, 713, 813 loads the software code or instructions via a direct interface with the computer readable medium or via a wired and/or wireless network. Upon loading and executing such software code or instructions by controller 213, 313, 413, 513, 613, 713, 813, controller 213, 313, 413, 513, 613, 713, 813 may perform any of the functionality of controller 213, 313, 413, 513, 613, 713 described herein, including any steps of the method 1200.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural system for harvesting a forage crop material, the system comprising:
   a first agricultural work equipment for controllably harvesting the forage crop material, the first agricultural work equipment including:
      a first forage processing assembly including a mower-conditioner associated with a cutting apparatus, an upper roller, and a swath gate;
      a first control system including:
         a first forage processing assembly condition sensor configured for sensing a first actual condition of the first forage processing assembly and thereby for outputting a first actual condition signal associated with the first actual condition of the first forage processing assembly;
         at least one of (a) a first forage processing assembly forage crop material yield sensor positioned on the swath gate that is configured for sensing an actual forage crop material yield during a first forage processing operation and for outputting an actual forage crop material yield signal associated with the actual forage crop material yield, or (b) a first forage processing assembly forage crop material moisture sensor connected to the swath gate that is configured for sensing an actual forage crop material moisture during the first forage processing operation and for outputting an actual forage crop material moisture signal associated with the actual forage crop material moisture;
         a first controller operatively coupled with the first forage processing assembly condition sensor, the at least one of the first forage processing assembly forage crop material yield sensor or the first forage processing assembly forage crop material moisture sensor, and the first forage processing assembly and configured for:
            receiving the first actual condition signal;
            receiving at least one of the actual forage crop material yield signal or the actual forage crop material moisture signal:
            determining a first adjustment signal based at least in part on the first actual condition signal and at least one first predicted forage crop material condition associated with the first forage processing operation, the at least one first predicted forage crop material condition including a predicted yield of the forage crop material;
         determining a second adjustment signal based at least in part on at least one of the actual forage crop material yield signal and the actual forage crop material moisture signal; and
         outputting the first adjustment signal and thereby for initially adjusting, prior to beginning the first forage processing operation, a first device of the first forage processing assembly and outputting the second adjustment signal and thereby for further adjusting, after beginning the first forage processing operation, the first device of the forage processing assembly.

2. The agricultural system of claim 1,
   wherein the agricultural system further including a second agricultural work equipment for controllably harvesting the forage crop material, the second agricultural work equipment being configured for performing any subsequent forage processing operation that is subsequent to the first forage procession operation, the second agricultural work equipment including:
   a second forage processing assembly;
   a second control system operatively coupled with the first control system, the second control system including:
      a second controller operatively coupled with the first controller of the first agricultural work equipment and the second forage processing assembly and configured for:
      determining another adjustment signal based at least in part on at least one of the at least one first predicted forage crop material condition of the first forage processing operation, the actual forage crop material yield signal of the first forage processing operation, the actual forage crop material moisture signal of the first forage processing operation, a final actual forage crop material yield of the first forage processing operation, and a final actual forage crop material moisture of the first forage processing operation;
      outputting the other adjustment signal and thereby for adjusting another device of the second forage processing assembly.

3. The agricultural system of claim 1, further including a computing machine including a controller operatively coupled with the first controller of the first agricultural work equipment,
   wherein the controller of the computing machine is configured for determining when to conduct a second forage processing operation based at least in part on at least one of a final actual forage crop material yield of the first forage processing operation and a final actual forage crop material moisture of the first forage processing operation,
   wherein the first forage processing operation includes mowing and conditioning, and the second forage processing operation is subsequent to the first forage processing operation and is one of tedding, raking, merging, baling, and chopping.

4. The agricultural system of claim 1, further including a second agricultural work equipment for controllably harvesting the forage crop material, the second agricultural work equipment including:
   a second forage processing assembly;
   a second control system operatively coupled with the first control system and configured for being operatively coupled with a control system of at least one interme-
diate agricultural work equipment, the second control
system including:

a second forage processing assembly condition sensor
configured for sensing a second actual condition of
the forage processing assembly and thereby for out-
putting a second actual condition signal associated
with the second actual condition of the forage pro-
cessing assembly;

a second controller operatively coupled with the second
forage processing assembly condition sensor and the
second forage processing assembly and configured
for:

receiving the second actual condition signal;

determining a third adjustment signal based at least
in part on the second actual condition signal and at
least one second predicted forage crop material
condition associated with a second forage process-
ing operation;

outputting the third adjustment signal and thereby
for initially adjusting, prior to beginning the sec-
ond forage processing operation, a second device
of the second forage processing assembly.

5. The agricultural system of claim 1, further including a
second agricultural work equipment for controllably har-
vesting the forage crop material, the second agricultural
work equipment including:

a second forage processing assembly;

a steering mechanism;

a second control system operatively coupled with the first
control system and configured for being operatively
coupled with a control system of at least one interme-
diate agricultural work equipment, the second control
system including:

a second controller operatively coupled with the second
forage processing assembly and the steering mecha-
nism, the second controller configured for:

determining a path signal based at least in part on one
of an actual row position of at least one row of a
cut forage crop material of an immediately pre-
ceding forage processing operation and an actual
bale position of at least one bale of the forage crop
material of the immediately preceding forage pro-
cessing operation;

outputting the path signal and thereby adjusting the
steering mechanism to correspond with one of the
actual row position and the actual bale position so
as to conduct a second forage processing operation
with the second forage processing assembly, wherein, when the second forage processing operation
is one of a baling operation and a bale retrieval
operation, the second controller is configured for
receiving at least one of a signal associated with a
respective bale weight and a signal associated with a
respective bale moisture.

6. An agricultural work equipment for controllably har-
vesting a forage crop material and being of an agricultural
system for harvesting the forage crop material, the agricul-
tural work equipment comprising:

a forage processing assembly including a mower-condi-
tioner associated with a cutting apparatus, an upper
roller, and a swath gate;

a control system including:

a forage processing assembly condition sensor config-
ured for sensing an actual condition of the forage
processing assembly and thereby for outputting an actual condition signal associated with the actual
condition of the forage processing assembly;

at least one of (a) a first forage processing assembly
forage crop material yield sensor positioned on the
swath gate that is configured for sensing an actual
forage crop material yield during a first forage process-
ing operation and for outputting an actual forage crop
material yield signal associated with the actual forage
crop material yield, or (b) a first forage processing
assembly forage crop material moisture sensor con-
nected to the swath gate that is configured for sensing
an actual forage crop material moisture during the first
forage processing operation and for outputting an
actual forage crop material moisture signal associated
with the actual forage crop material moisture;

a controller operatively coupled with the forage pro-
cessing assembly condition sensor, the at least one of
the first forage processing assembly forage crop
material yield sensor or the first forage processing
assembly forage crop material moisture sensor, and
the forage processing assembly and configured for:

receiving the actual condition signal;

receiving at least one of the actual forage crop
material yield signal of the actual forage crop
material moisture signal;

determining a first adjustment signal based at least in
part on the actual condition signal and at least one
predicted forage crop material condition associ-
ated with the forage processing operation, the at
least one first predicted forage crop material con-
dition including a predicted yield of the forage
crop material;

determining a second adjustment signal based at
least in part on at least one of the actual forage
crop material yield signal and the actual forage
crop material moisture signal; and outputting the first adjustment signal and thereby for
initially adjusting, prior to beginning the forage
processing operation, a device of the forage pro-
cessing assembly and outputting the second
adjustment signal and thereby for further adjust-
ing, after beginning the first forage processing
operation, the first device of the forage processing
assembly.

7. A method for controllably harvesting a forage crop
material by an agricultural system, the method comprising
the steps of:

providing the agricultural system which includes a first
agricultural work equipment for controllably harvest-
ing the forage crop material, the first agricultural work
equipment including a first forage processing assembly
including a mower-conditioner associated with a cut-
ting apparatus, an upper roller, and a swath gate, and a
first control system including a first forage processing
assembly condition sensor, at least one of (a) a first
forage processing assembly forage crop material yield
sensor positioned on the swath gate that is configured
for sensing an actual forage crop material yield during
a first forage processing operation and for outputting an
actual forage crop material yield signal associated with
the actual forage crop material yield, or (b) a first
forage processing assembly forage crop material mois-
ture sensor connected to the swath gate that is config-
ured for sensing an actual forage crop material moisture
during the first forage processing operation and for
outputting an actual forage crop material moisture
signal associated with the actual forage crop material moisture, and a first controller operatively coupled with the first forage processing assembly condition sensor the at least one of the first forage processing assembly forage crop material yield sensor or the first forage processing assembly forage crop material moisture sensor, and the first forage processing assembly;

sensing, by the first forage processing assembly condition sensor, a first actual condition of the first forage processing assembly and thereby outputting a first actual condition signal associated with the first actual condition of the first forage processing assembly;

receiving, by the first controller, the first actual condition signal;

receiving at least one of the actual forage crop material yield signal or the actual forage crop material moisture signal;

determining, by the first controller, a first adjustment signal based at least in part on the first actual condition signal and at least one first predicted forage crop material condition associated with the first forage processing operation, the at least one first predicted forage crop material condition including a predicted yield of the forage crop material;

determining a second adjustment signal based at least in part on at least one of the actual forage crop material yield signal and the actual forage crop material moisture signal; and outputting, by the first controller, the first adjustment signal and thereby for initially adjusting, prior to beginning the first forage processing operation, a first device of the first forage processing assembly and outputting the second adjustment signal and thereby for further adjusting after beginning the first forage processing operation, the first device of the forage processing assembly.

8. The method of claim 7, wherein the agricultural system further includes a computing machine including a controller operatively coupled with the first controller of the first agricultural work equipment, wherein the controller of the computing machine is configured for determining when to conduct a second forage processing operation based at least in part on at least one of a final actual forage crop material yield of the first forage processing operation and a final actual forage crop material moisture of the first forage processing operation, wherein the first forage processing operation includes mowing and conditioning, and the second forage processing operation is subsequent to the first forage processing operation and is one of tedding, raking, merging, baling, and chopping.

9. The method of claim 7, wherein the agricultural system further includes a second agricultural work equipment for controllably harvesting the forage crop material, the second agricultural work equipment including:

a second forage processing assembly;

a second control system operatively coupled with the first control system and configured for being operatively coupled with a control system of at least one intermediate agricultural work equipment, the second control system including:

a second forage processing assembly condition sensor configured for sensing a second actual condition of the forage processing assembly and thereby for outputting a second actual condition signal associated with the second actual condition of the forage processing assembly;

a second controller operatively coupled with the second forage processing assembly condition sensor and the second forage processing assembly and configured for:

receiving the second actual condition signal;

determining a third adjustment signal based at least in part on the second actual condition signal and at least one second predicted forage crop material condition associated with a second forage processing operation;

outputting the third adjustment signal and thereby for initially adjusting, prior to beginning the second forage processing operation, a second device of the second forage processing assembly.

10. The method of claim 7, wherein the agricultural system further includes a second agricultural work equipment for controllably harvesting the forage crop material, the second agricultural work equipment including:

a second forage processing assembly;

a steering mechanism;

a second control system operatively coupled with the first control system and configured for being operatively coupled with a control system of at least one intermediate agricultural work equipment, the second control system including:

a second controller operatively coupled with the second forage processing assembly and the steering mechanism, the second controller configured for:

determining a path signal based at least in part on one of an actual row position of at least one row of a cut forage crop material of an immediately preceding forage processing operation and an actual bale position of at least one bale of the forage crop material of the immediately preceding forage processing operation;

outputting the path signal and thereby adjusting the steering mechanism to correspond with one of the actual row position and the actual bale position so as to conduct a second forage processing operation with the second forage processing assembly, wherein, when the second forage processing operation is one of a baling operation and a bale retrieval operation, the second controller is configured for receiving at least one of a signal associated with a respective bale weight and a signal associated with a respective bale moisture.

\* \* \* \* \*